United States Patent
Ku et al.

(10) Patent No.: US 10,289,156 B2
(45) Date of Patent: *May 14, 2019

(54) METHOD OF CONTROLLING MOBILE ELECTRONIC DEVICE THROUGH A COVER, MOBILE ELECTRONIC DEVICE USING THE SAME AND NON-TRANSITORY STORAGE MEDIUM THEREOF

(71) Applicant: HTC Corporation, Taoyuan (TW)

(72) Inventors: Tai-Hsin Ku, Taoyuan (TW); Chia-Mo Chien, Taoyuan (TW); Sheng-Hsin Huang, Taoyuan (TW); Fang-Ju Lin, Taoyuan (TW); Wei-Chia Yen, Taoyuan (TW); Jen-Hou Huang, Taoyuan (TW); Chun-Ta Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/884,412

(22) Filed: Jan. 31, 2018

(65) Prior Publication Data

US 2018/0150104 A1 May 31, 2018

Related U.S. Application Data

(63) Continuation of application No. 14/666,325, filed on Mar. 24, 2015, now Pat. No. 9,904,316.

(Continued)

(51) Int. Cl.
| | |
|---|---|
| *G06F 1/16* | (2006.01) |
| *G06F 1/32* | (2006.01) |
| *G06F 3/14* | (2006.01) |
| *G06F 1/3206* | (2019.01) |
| *G06F 1/3234* | (2019.01) |

(52) U.S. Cl.
CPC .......... *G06F 1/1626* (2013.01); *G06F 1/1677* (2013.01); *G06F 1/3206* (2013.01); *G06F 1/3262* (2013.01); *G06F 1/3265* (2013.01); *G06F 3/14* (2013.01);
(Continued)

(58) Field of Classification Search
CPC ........ G06F 3/041–3/047; G06F 1/1626; G06F 3/0418; G06F 3/0412; G06F 3/042; G06F 2203/04102; A61B 5/02055; A61B 5/0261; A61B 5/6898; A61B 5/015; A61B 5/021; A61B 5/02433; A61B 5/14552;
(Continued)

(56) References Cited

U.S. PATENT DOCUMENTS 9,904,316 B2 * 2/2018 Ku ........................ G06F 1/1626

* cited by examiner

*Primary Examiner* — Stephen G Sherman
(74) *Attorney, Agent, or Firm* — JCIPRNET

(57) ABSTRACT

In one of the exemplary embodiments of the disclosure, a method of controlling through a cover of a mobile electronic device would include not limited to detecting, by the mobile electronic device, for a first event and a device triggering event; displaying, through openings of the cover on the touch screen, a first image; replacing the first image with a second image that corresponds to the first event in response to the first event being detected; displaying, through the openings of the cover on the touch screen, a third image corresponding to the device triggering event while the first image or the second image is still being displayed; and performing a function corresponding to the device triggering event in response to a touch input on third image being detected by the touch screen through the cover.

18 Claims, 20 Drawing Sheets

Related U.S. Application Data

(60) Provisional application No. 61/969,279, filed on Mar. 24, 2014, provisional application No. 62/016,112, filed on Jun. 24, 2014.

(52) U.S. Cl.
CPC . *G06F 2200/1634* (2013.01); *G09G 2340/14* (2013.01); *Y02D 10/153* (2018.01)

(58) Field of Classification Search
CPC .... A61B 2560/0431; A61B 2560/0462; A61B 2562/0238
USPC ......... 345/173–178; 178/18.01–18.09, 18.11
See application file for complete search history.

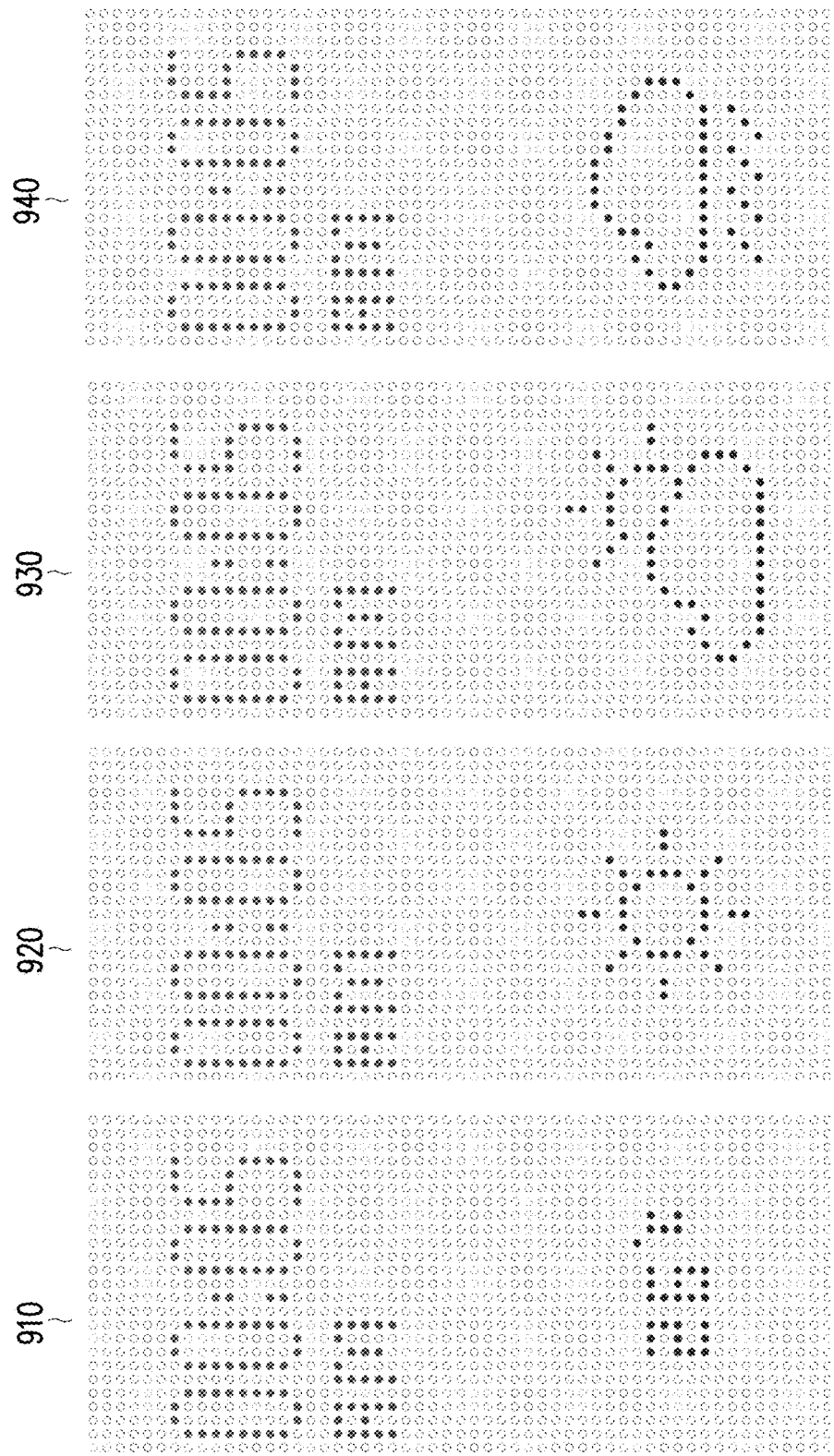

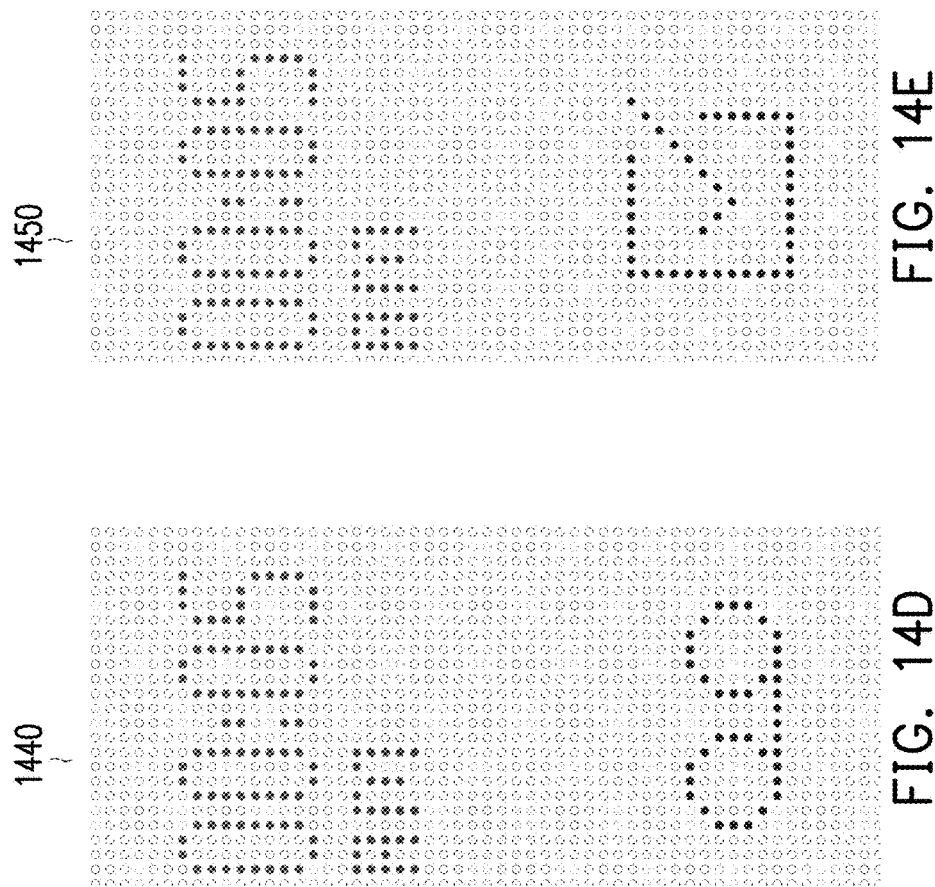

METHOD OF CONTROLLING MOBILE ELECTRONIC DEVICE THROUGH A COVER, MOBILE ELECTRONIC DEVICE USING THE SAME AND NON-TRANSITORY STORAGE MEDIUM THEREOF

CROSS REFERENCE TO RELATED APPLICATION

This application is a continuation application of and claims the priority benefit of U.S. application Ser. No. 14/666,325, filed on Mar. 24, 2015, now pending, which claims the priority benefit of U.S.A. provisional application Ser. No. 61/969,279, filed on Mar. 24, 2014 and U.S.A. provisional application Ser. No. 62/016,112, filed on Jun. 24, 2014. The entirety of each of the above-mentioned patent application is hereby incorporated by reference herein and made a part of specification.

TECHNICAL FIELD

The disclosure is directed to a method of a mobile electronic device through a cover, a mobile electronic device using the same, and a non-transitory storage medium thereof.

BACKGROUND

Having diverse functions and thin designs allow mobile electronic devices such as a smart phone or a tablet computer to become mobile and versatile. However, these mobile electronic devices may become damaged as they move around from places to places. For example, the mobile electronic device may be dropped, scratched, or sat on. Consequently, relevant accessories are also vigorously developed in order to prevent mobile electronic devices from being damaged. In particular, protective accessories such as a protective casing or a protective cover are among the most popular accessories. One type of the protective casing is designed in a wallet-style or a book cover style for which the protective casing may have a cover portion that covers a display area such as the touch display screen of the tablet device to avoid damage to the display area. Similarly, for the protective cover, there would also be a cover portion to achieve similar protections.

However, the cover portion is often inconvenient to use as a user would have to open the cover portion in order to view the content of the notification in the display area when the mobile electronic devices receive a notification, For instance, when a smart phone receives an incoming call, the user would have to open the cover portion in order to view caller information displayed in the display area to decide whether to answer the call. Furthermore, users may drop the mobile electronic devices while he or she is trying to open the cover portion to view the content of the notification. Although the cover portion covers the display area to avoid damage, however, it is inconvenience for the user to operate.

SUMMARY OF THE DISCLOSURE

Accordingly, the disclosure is directed to a method of controlling a mobile electronic device through a cover, a mobile electronic device using the same, and a non-transitory storage medium thereof.

In one of the exemplary embodiments, the disclosure is directed to a method of controlling a mobile electronic device through a cover. The method includes but not limit to In one of the exemplary embodiments, the disclosure is directed to a mobile electronic device that includes: a touch screen; a cover for covering the touch screen; an input device couple to the touch screen for detecting touch events; and a processing circuit coupled to the touch screen. The processing circuit is configured at least for: displaying, through openings of the cover on the touch screen, a first image; replacing the first image with a second image that corresponds to the first event in response to the first event being detected; displaying, through the openings of the cover on the touch screen, a third image corresponding to the device triggering event in response to the device triggering event being detected; and performing a function corresponding to the device triggering event in response to a first touch input on third image being detected by the input device through the cover.

In one of the exemplary embodiment, the disclosure is directed to a non-transitory storage medium, incorporated within a mobile electronic device having a cover. The storage medium would contain computer readable instructions which control the mobile electronic device to execute functions that include: detecting, by the mobile electronic device, for a first event and a device triggering event; displaying, through openings of the cover on the touch screen, a first image; replacing the first image with a second image that corresponds to the first event in response to the first event being detected; displaying, through the openings of the cover on the touch screen, a third image corresponding to the device triggering event in response to the device triggering event being detected; and performing a function corresponding to the device triggering event in response to a first touch input on third image being detected by the touch screen through the cover.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 9A~FIG. 9D illustrate an image displaying time and weather information in the dot-matrix display mode according to one of the exemplary embodiment of the disclosure.

FIG. 14A~14E are diagrams illustrating a user-interface when an electronic device has a notification in the dot-matrix display mode in accordance with one of the exemplary embodiments of the disclosure.

DETAILED DESCRIPTION OF DISCLOSED EMBODIMENTS

Figure 1:
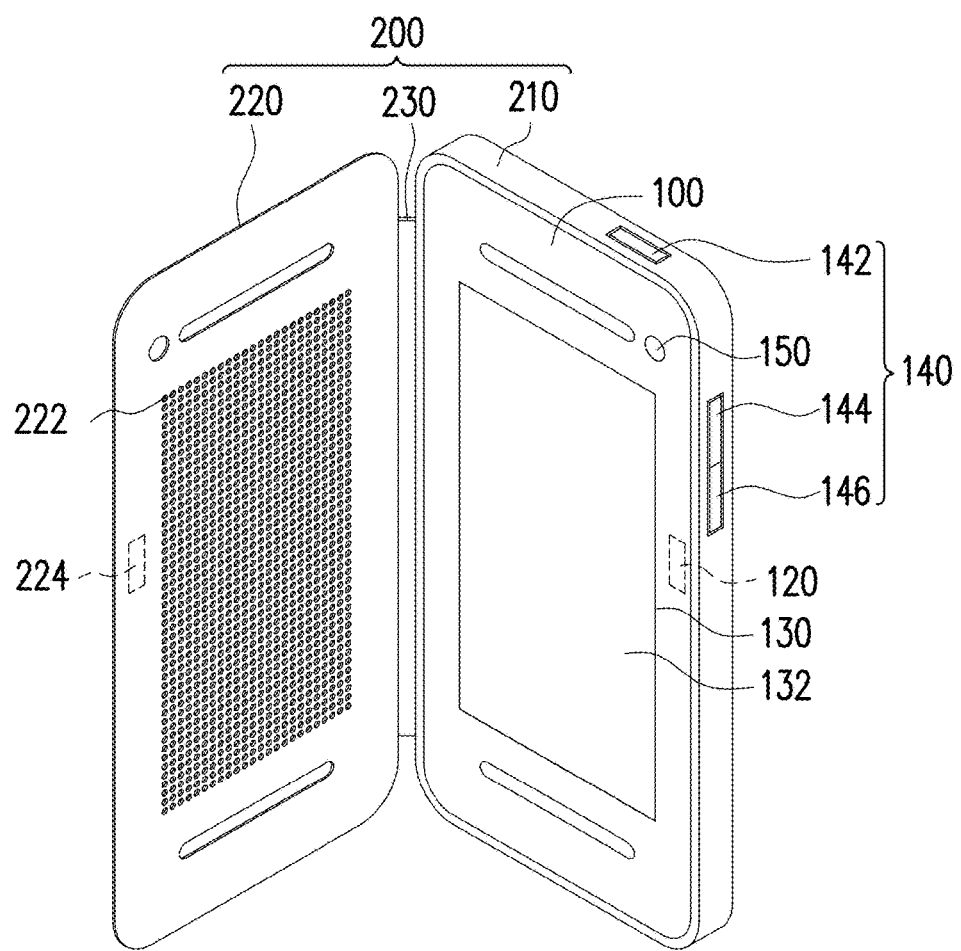
FIG. 1 illustrating an electronic device incorporated with a protective accessory in accordance with one of the exemplary embodiments of the disclosure.

A method of controlling a mobile electronic device through a cover, and a mobile electronic device using the same, and a non-transitory storage medium thereof. The disclosure allows a user to interact with the electronic device having the cover without necessarily having to open the cover, from which the user may still view information provided by the electronic device and operate the electronic device. To make the above features and advantages of the application more comprehensible, several embodiments accompanied with drawings are described in detail as follows. Wherever possible, the same reference numbers are used in the drawings and the description to refer to the same or like parts.

Figure 2:
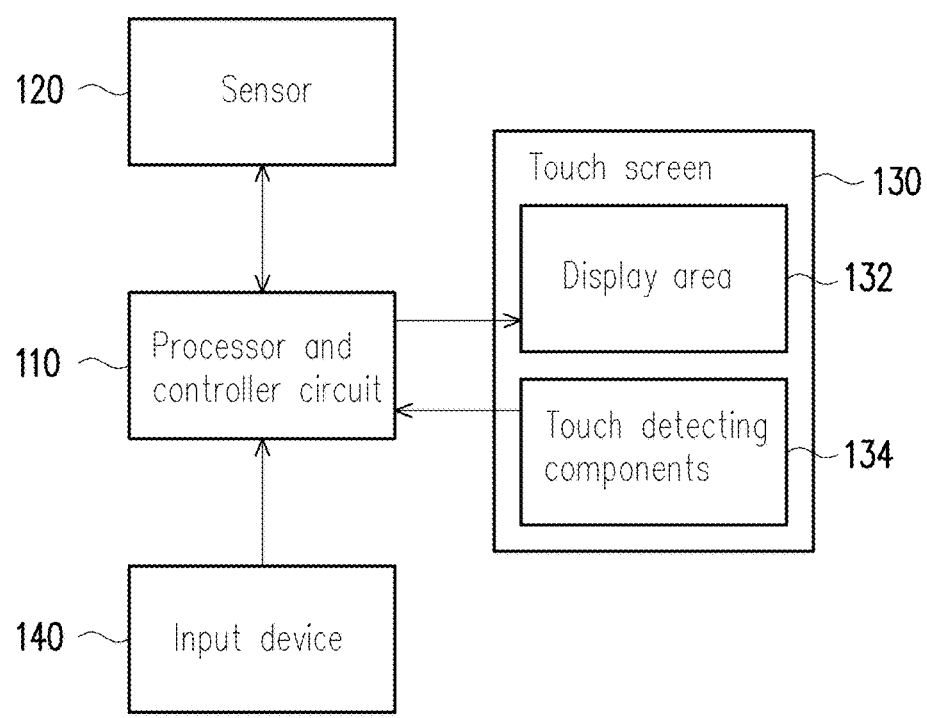
FIG. 2 illustrates an electronic device in terms of functional block diagrams in accordance with one of the exemplary embodiments of the present disclosure.

FIG. 1 is a schematic diagram illustrating the electronic device 100 with a protective accessory 200 according to an embodiment of the disclosure. FIG. 2 illustrates the hardware of an electronic device in terms of functional block diagrams in accordance with one of the exemplary embodiments of the present disclosure. With reference to FIG. 1 and FIG. 2, the exemplary electronic device 100 may be, but not limit to, a mobile phone, a smart phone, a personal digital assistant (PDA), a tablet computer, an electronic book, a gaming console, and any other electronic device having a touch screen. The electronic device 100 may include a processor and controller circuit 110, a sensor 120, a touch screen 130 having a display area 132, and an input device 140. In the present disclosure, the processor and controller circuit 110 may be electrically coupled to the sensor 120, the touch screen 130 and the input device 140, respectively.

The processor and controller circuit 110 may be a central processing unit (CPU), or a programmable microprocessor, a digital signal processor (DSP), a programmable controller, an application specific integrated circuit (ASIC), a programmable logic device (PLD) or other similar devices or a combination thereof utilized for general or specific application. The processor and controller circuit 130 would control all of the operation of the electronic device 100.

The sensor 120 could be, but not limited to, a Hall Effect sensor, a magnet sensor, or the likes. In the present embodiment, the sensor 120 may detect a magnetic element in response to changes in the magnetic field and may provide signals to inform the processor and controller circuit 110. Furthermore, the sensor 120 may differentiate two opposing magnetic poles such as a positive magnetic pole (i.e., North magnetic pole) or a negative magnetic pole (i.e., South magnetic pole).

The touch screen 130 may be a display device integrated with touch detecting components 134, which could simultaneously provide a display function and an input function within the display area 132 of the electronic device 100. The display device may be, but not limited to, a liquid crystal display (LCD), a light-emitting diode (LED), a field emission display (FED), or other displays. The touch detecting components 134 are disposed in the display device and arranged in rows and columns, which are configured to detect a touch event. The touch event may include events generated by touching the touch screen 130 with a finger, a palm, body parts or other objects. The touch detecting components 134 may be, but not limited to, a resistive, a capacitive or other types of touch sensing devices which would be integrated as a part of the touch screen 130.

The input device 140 may be, but not limited to, a physical switch, a button, or a touch sensing device. The input device 140 is disposed at the outer surface of the electronic device 100 accessible to the user and electrically coupled to the processor and controller circuit 110. In the present embodiment, the input device 140 may be pressed to operate the electronic device 100.

The processor and controller circuit could further be coupled to a non-transitory storage medium which could be a hard disk drive or a flash disk drive that provides non-temporary storage to information such as compute readable codes loaded into the processor and controller circuit to execute functions related to the proposed method of controlling a cover of a mobile electronic device.

With reference to FIG. 1, the protective accessory 200 may include a coupling portion 210, a cover portion 220 and a flexible portion 230, where the coupling portion 210 is coupled to the cover portion 220 through the flexible portion 230.

In the present embodiment, the coupling portion 210 may be a pocket that accommodates the electronic device 100 by securing and covering 4 sides and rear of the electronic device 100. However, the disclosure is not limited thereto. In another exemplary embodiment of the disclosure, the protective accessory 200 could be coupled to the electronic device 100 by other means. For example, the coupling portion 210 of the protective accessory 200 could be a magnetic component that couples the cover portion 220 and the flexible portion 230 to the electronic device 100 by a magnetic force.

The cover portion 220 includes a plurality of light-transmitting areas 222 and a magnetic component 224, which is configured to cover a display area 132 of the electronic device 100 when the cover portion 220 is in a position leaning against the electronic device 100 (i.e., the cover portion 220 covers the display area 132). The light-transmitting areas 222 of the cover portion 220 are arranged in rows and columns forming a matrix or array covering the display area 132 of the touch screen 130. The light-transmitting areas 222 may be areas that light may transmit through such as ditches and through-holes.

The magnetic component 224 may be disposed in a manner that only one of a positive magnetic pole and a negative magnetic pole of the magnetic component 224 may be sensed by the sensor 120. For example, the magnetic component 224 may be disposed in an orientation that a portion of the magnetic component 224 having the positive magnetic pole would face the sensor 120. As such, the sensor 120 would sense the positive magnetic pole according to the orientation of the magnetic component 224. In one of the exemplary embodiment, the magnetic component 224 having different magnetic poles may be utilized to differentiate different cover portion 220. For example, another exemplary cover portion 220 of the protective accessory 200 may have different spacing between each of the light-transmitting areas 222.

The flexible portion 230 couples the cover portion 220 to the coupling portion 210, and serves as a hinge for the cover portion 220 with respect to the coupling portion 210. In other words, the position of the cover portion 220 with respect to the coupling portion 210 may be changed by bending the flexible portion 230 to either cover or uncover the display area 132 of the electronic device 100 with the cover portion 220, which may also be referred to as closing or opening the cover portion 220 with respect to the electronic device 100.

In the present embodiment, when the cover portion 220 of the protective accessory 200 covers the display area 132 of the electronic device 100, the sensor 120 of the electronic device 100 would detect the magnetic component 224 of the cover portion 220. In detail, the sensor 120 of the electronic device 100 detects a change in magnetic field and informs the processor and controller circuit 110 to set the electronic device 100 in a dot-matrix display mode. In the dot-matrix display mode, the touch screen 130 would display an image in a dot-matrix pattern (which may also be referred to as a dot-matrix image) for the user to view without the need of opening the cover portion 220. Here, the image displayed in the dot-matrix pattern may have a dimension occupying a partial or the entire display area of the touch screen 130. In detail, the image generated by the touch screen 130 may be designed specifically to fit into or to be shaped by the spacing of the light transmitting areas 222 of the cover portion 220, so that the image may be projected through the light-transmitting areas 222 of the cover portion 220 to be viewed without opening the covering portion 220.

Figure 5:
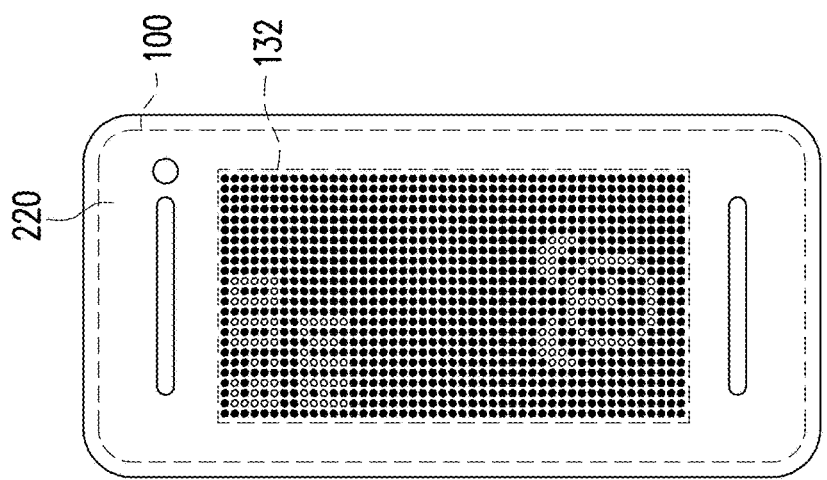
FIG. 5 illustrates displaying the image on the display area of the electronic device of FIG. 3 through the cover of FIG. 4 because of the alarm clock event according to one of the exemplary embodiments of the disclosure.
Figure 4:
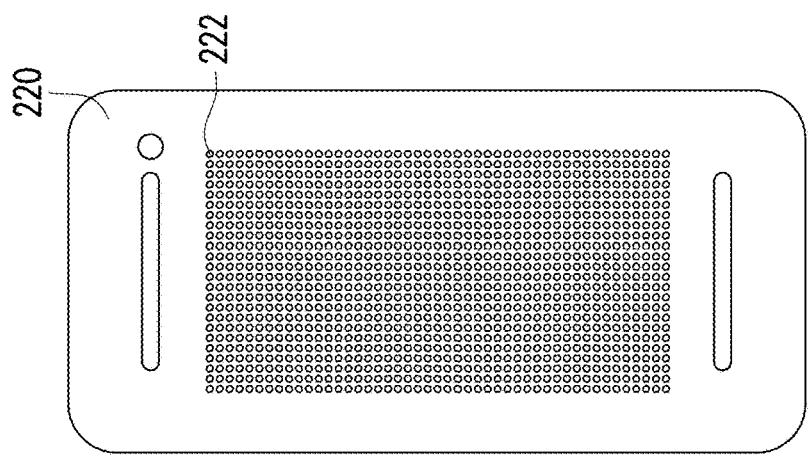
FIG. 4 illustrates a cover of an electronic device in accordance with one of the exemplary embodiments of the disclosure.
Figure 3:
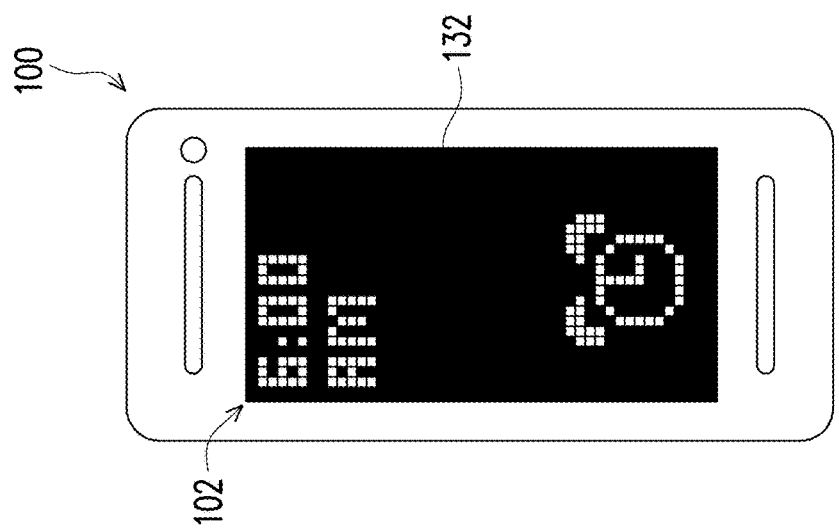
FIG. 3 illustrates displaying an image on a display area of the electronic device as the result of an alarm clock event in accordance with one of the exemplary embodiments of the disclosure.

With reference to FIGS. 3, 4 and 5, an image 102 is displayed on the display area 132 of the electronic device 100 due to an alarm clock event (i.e., an alert) according to one of the exemplary embodiments of the disclosure. FIG. 3 depicts the display area 132 of the electronic device 100 without the cover portion 220 of the protective accessory 200. FIG. 4 illustrates a front view of the cover portion 220 of the accessory 200 illustrated in FIG. 1. When the cover portion 220 of the protective accessory 200 illustrated in FIG. 4 is placed above the display area 132 of the electronic device 100 illustrated in FIG. 3, the light that forms the image 102 would be transmitted through the light-transmitting areas 222 of the cover portion 220, as illustrated in FIG. 5, so that the user may view the image 102 while the display area 132 is covered or protected by the cover portion 220.

It should be noted that the image 102 may be generated by combining two different layers such as a bottom layer and an upper layer. In the exemplary embodiment, the bottom layer may be painted in a color gradient style as a background color. That is, the color density of the displayed background color would increase or decrease from one side of the bottom layer to another. The disclosure is not limited to the color density, the color gradient effect may also be applied to a mixture of different colors. For example, the color (e.g., red) painted on one side of the bottom layer may gradually transit into a different color (e.g., green) as it reaches another side of the bottom layer. On the other hand, the upper layer may be painted in black, and a shape of a desired content (e.g., phone number) may be cut out from the upper layer. Then, the upper layer may act as a mask which would be placed above the bottom layer, so that the color displayed in the lower layer may be projected through the cut out areas of the upper layer. Thus, the context or content of the image 102 may be viewed in accordance with the background color of the bottom layer, which would have a color gradient effect. The present exemplary embodiment of the disclosure is not intended to limit the disclosure. In another exemplary embodiment, the background color of the bottom layer may be colored without color gradient effect.

Furthermore, the image 102 may be generated in accordance with the spacing of the light-transmitting areas 222 of the cover portion 220, so that the image 102 generated by the electronic device 100 may be aligned with the light-transmitting areas 222.

Figure 6:
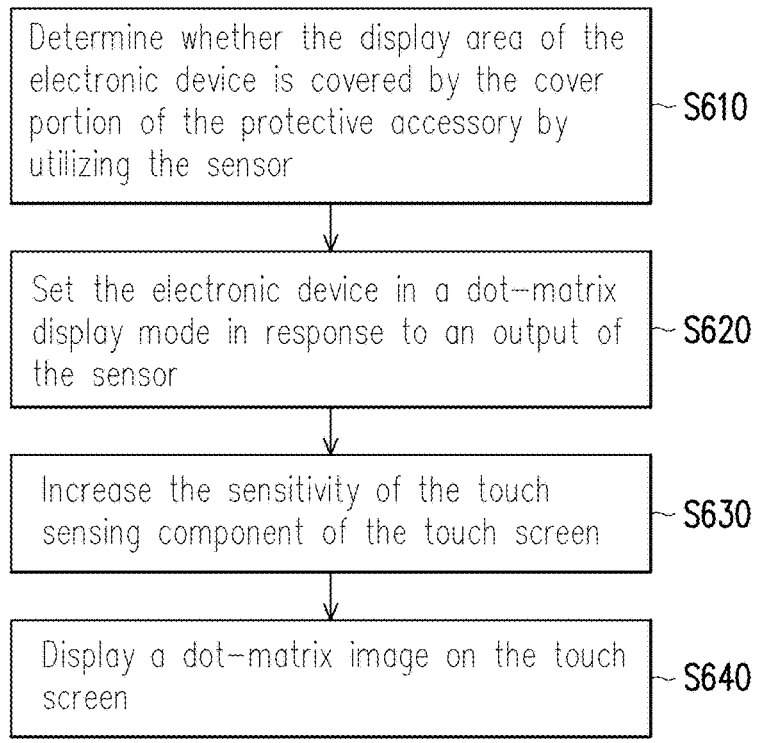
FIG. 6 is flow chart illustrating a method of setting the electronic device in the dot-matrix mode in accordance with one of the exemplary embodiment of the disclosure.

FIG. 6 is flow chart illustrating a method of setting the electronic device 100 in the dot-matrix mode in accordance with one of the exemplary embodiment of the disclosure.

In step S610, the processor and controller circuit 110 determines whether the display area 132 of the electronic device 100 is covered by the cover portion 220 of the protective accessory 200 by utilizing the sensor 120. In detail, the magnetic component 224 of the cover portion 220 would trip the sensor 120 of the electronic device 100 when the magnetic component 224 is brought to a closed location close to the sensor 120 (i.e., the cover portion 220 is closed). The sensor 120 would transmit an output to the processor and controller circuit 110 indicating that the cover portion 220 is closed covering the display area 132 of the electronic device 100.

In step S620, the processor and controller circuit 110 would set the electronic device 100 in a dot-matrix display mode in response to the output of the sensor 120. In the dot-matrix display mode, the image would be displayed in a dot-matrix pattern (which also refers to a dot-matrix image), which would be projected through the light-transmitting areas 222 of the cover portion 220 for the user to view.

In step S630, the electronic device 100 would increase the sensitivity of the touch detecting components 134 of the touch screen 130, so that the touch detecting components 134 could detect touch operations applied to the cover portion 220 which is disposed above the touch screen 130 when the cover portion 220 is closed covering the display area 132 of the touch screen 130.

In step S640, the electronic device 100 would display the dot-matrix image in the display area 132 of the touch screen 130. In the disclosure, the dot-matrix image may be, but not limited to, information regarding time, date, weather, temperature, caller ID, notification, alert, status and so forth.

In the present embodiment, the electronic device 100 may display information on the touch screen 130 for the user to view in accordance with various events. These events may include, but not limited to, an incoming call, an alert, a notification, and time and weather information. The alert may include, but not limited to, an alarm clock, a scheduled calendar event, a to-do event, a timer, and so forth. The notification may include, but not limited to, a low battery alert, a miss call alert, a new text message alert, an email message alert, a new voice mail alert, and so forth.

Figure 7:
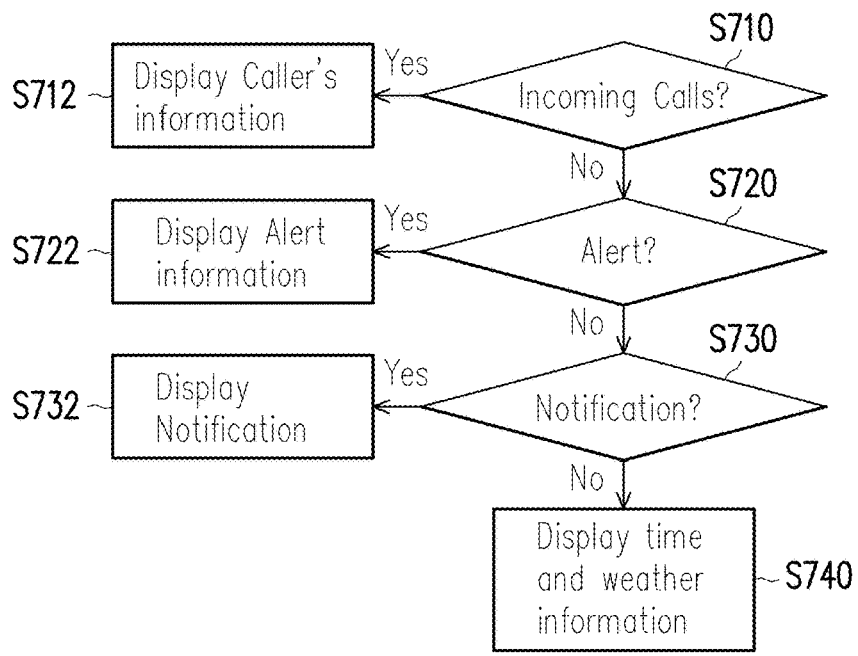
FIG. 7 is a flow chart illustrating a hierarchy of different possible events in accordance with one of the exemplary embodiments of the disclosure.

FIG. 7 is a flow chart illustrating a hierarchy of different events in accordance with one of the exemplary embodiments of the disclosure. FIG. 7 illustrates a process to which the electronic device 100 would go through in order to determine information to display in accordance with the hierarchy of different events.

With reference to FIG. 7, the electronic device 100 would display information corresponding to these events in a priority sequence of incoming call, the alert, the notification, and time and weather information, however, the disclosure is not limited thereto. In the present embodiment, the incoming call event has a highest priority over the rest of the events. In step S710, it is first determined that whether there is an incoming call. If yes, the electronic device 100 would display, for example, caller's information on the touch screen 130 (step S712). If no, the process goes to step S720.

In the step S720, the electronic device 100 would determine whether there is an alert event (step S720). If yes, the electronic device 100 would display information corresponding to the alert event on the touch screen 130 such as an alarm clock with a current time (step S722). In no, process goes to step S730.

In the step 730, the electronic device 100 would determine whether there is a notification event. If yes, the electronic device 100 would display information corresponding to the notification on the touch screen 130 such as miss call, new email message, low battery, and so forth (step S732). If no, the electronic device 100 would display the time and whether information on the touch screen 130 (step S740). It should be noted that the electronic device 100 would display the last notification in a situation of multiple notifications.

Figure 8:
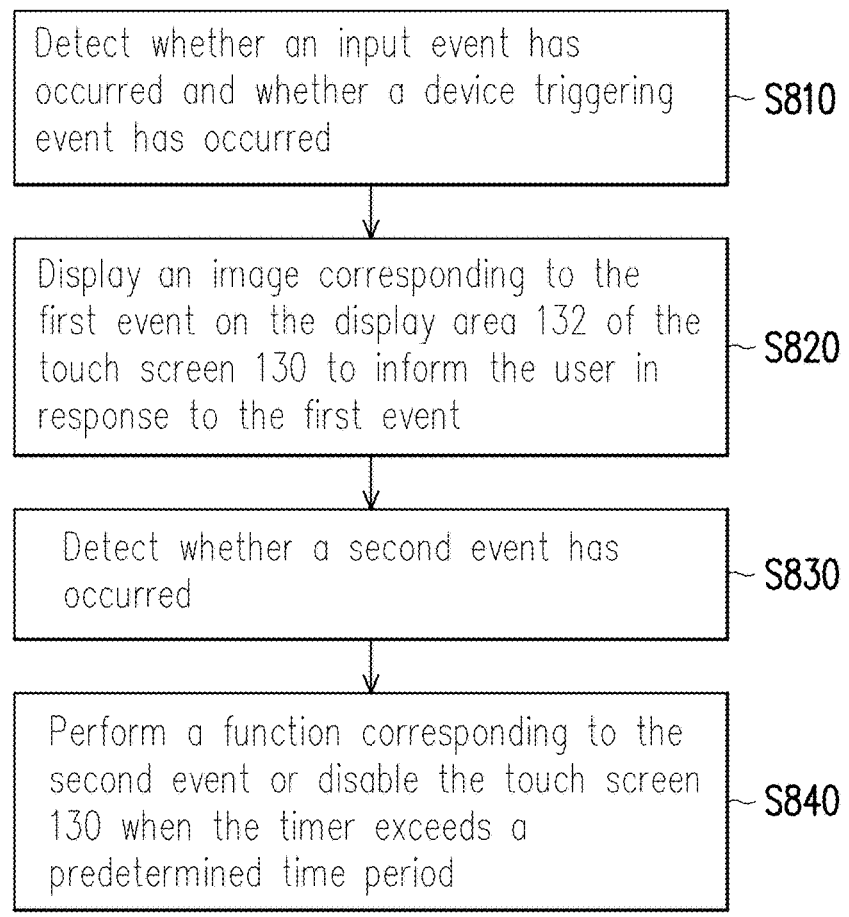
FIG. 8 is a flow chart illustrating an operating method that could be implemented by the exemplary electronic device of FIG. 1 configured in the dot-matrix display mode in accordance with one of the exemplary embodiments of the disclosure.

FIG. 8 is a flow chart illustrating an operating method of the exemplary electronic device 100 of FIG. 1 configured in the dot-matrix display mode according to one of the exemplary embodiments of the disclosure. In step S780, the electronic device 100 operating in the dot-matrix display mode would detect whether a first event has occurred. In the present embodiment, the first event may refer to a touch operation received from the touch screen 130, an input generated by pressing the input device 140, and a notification or an alert or an incoming call triggered by the electronic device 100.

The touch operation received by the touch screen 130 may be a double tap, swiping, multi-touch or any hand gestures applied to the cover portion 220 covering the display area 132 of the electronic device 100.

The input received by pressing the input device 140 may be, but not limited to, a force applied to the input device 140 such as pressing a finger on a switch. However, the disclosure is not limited thereto, the input device 140 may be a touch sensing switch which would sense touch operation.

The alert may refers to an alarm function, a scheduled event in the calendar, a to-do list function or a timer function of the electronic device 100. In addition, the notification may include, but not limited to, low battery, missed call, new test message, new email message, new voice message, and charging the battery.

In another exemplary embodiment, the first event may also refer to the manipulation of the cover portion 220 from an open state (i.e., the cover portion 220 is at a location away from the electronic device 100) to a close state (i.e., the cover portion 220 is at a location closest to the electronic device 100). When the sensor 120 is tripped due to the covering of the display area 132, one-shot function may be generated indicating that the cover portion 220 is recently moved to the closed state covering the display area 132.

In step S820, the electronic device 100 would display an image corresponding to the first event on the display area 132 of the touch screen 130 to inform the user in response to the first event. For example, if the first event generated by an alarm function that is configured to go off at 6:00 am, the electronic device 100 would play the sound of the alarm and display characters "6:00 am" and an alarm clock shape on the display area 132 of the touch screen 130 to inform the user of the alert function in response to the first event. In response to the first event, the electronic device 100 would start a timer.

In step S830, the electronic device 100 would determine whether a second event has occurred. The second event may include, but not limited to, pressing of the input device 140 or a touch operation applied to the cover portion 220 above the touch screen 130. The touch operation received by the touch screen 130 may be a double tap, swiping, multi-touch or any hand gestures applied to the cover portion 220 covering the display area 132 of the electronic device 100.

In step S840, the electronic device 100 would perform a function corresponding to the second event or disable the touch screen 130 when the timer exceeds a predetermined time period. For example, when a first event is received in response to an alert function, an image corresponding to the alert function may be displayed. If a swipe down touch operation is received (i.e., an second event is received), the electronic device 100 would perform a function corresponding to the swipe down touch operation. If no operation is received (i.e., no second event), the alert function would timeout after a predetermined time period, and the electronic device 100 may display the display function of the touch screen 140.

FIGS. 9-14 are diagrams illustrating an operating method illustrated in FIG. 8 of the electronic device 100 illustrated in FIG. 1 with various exemplary embodiments. In the exemplary embodiments illustrated in FIGS. 9-14, it is assumed that the exemplary electronic device 100 illustrated in FIGS. 9-14 are operated in the dot-matrix display mode unless it is mentioned otherwise. In other words, the display area 132 of the electronic device 100 would be covered by the cover portion 220 of the protective accessory 200. In addition, an image displayed on the display area 132 of the electronic device 100 would be projected through a plurality of light-transmitting areas 222 of the cover portion 220 for user to view, and operations corresponding to the displayed image may be performed through an input event received from the input device 140 or an touch event received from the touch screen 130.

FIGS. 9A-9D are diagrams illustrating an image displaying time and weather information in the dot-matrix display mode according to one of the exemplary embodiment of the disclosure. In the present embodiment, the image may include current time 902 (e.g., "00:05 AM") and weather information (e.g., temperature or weather condition) 904, which is displayed in the display area 132 of the touch screen in the dot-matrix pattern. With reference to FIG. 9A, the current time 902 is displayed at upper section of the display area 132, and the weather information 904 is displayed at low section of the display area 132. In FIG. 9A, a temperature of 26 degree Celsius is displayed as the weather information. However, the disclosure may also display different weather conditions such as sunny (FIG. 9B), partly cloudy (FIG. 9C), or rain (FIG. 9D). The disclosure is not limited to any configuration of time formation or weather information. The time format and the type of the weather information are configurable through setting of the electronic device 100.

It should be noted that the image displaying the time and the weather information is a default image. In other words, by default, when there are no other notification (i.e., which is described later) or other status of the electronic device 100, the image displaying the time and the weather information would be displayed in response to the input event received from the input device 140 or the touch screen 130. On the contrary, if there is a notification that is not cleared, the notification would take priority over the time and weather information. In other words, the electronic device 100 would display the notification instead of the time and weather information in response to the input event.

In the exemplary embodiment of FIGS. 9A-9D, when the input event (e.g., power button 142) may be received, the electronic device 100 would display the image showing the time and weather information when there are no notification that is not cleared. At the same time, the electronic device 100 would start a timer. Then, the action of pressing input device 140 or double tab the display area 132 may be performed to dismiss the displayed information or turn off the display. Otherwise, the displayed image (e.g., images 910, 920, 930 and 940) would dismiss automatically when the timer exceeds a predetermined time period.

FIGS. 9A-9C are diagrams illustrating a user interface of a volume adjustment of the electronic device 100 in the dot-matrix display mode according to one of the exemplary embodiments of the disclosure. In the present embodiment, the electronic device 100 may further include volume adjustment buttons 144 and 146. The user may adjust and view a degree of the volume without opening the cover portion 220. Upon a first event generated by the volume adjustment buttons 144 and 146, the electronic device 100 may display a current setting of the volume of the electronic device 100. FIG. 9A illustrates an image 910 showing a volume bar indicating the degree of the volume of the electronic device 100. FIG. 9B illustrates an image 920 showing a silent mode of the electronic device 100. FIG. 9C illustrates an image 930 showing a silent mode of the electronic device 100. In response to the triggered event, the electronic device 100 would start a timer.

For example, as illustrated in FIG. 9A, the electronic device 100 would display the image 910 having a bar indicating the degree of the volume in response to the input event triggered by the volume adjustment buttons 144 and 146. The volume of the electronic device 100 may be further adjusted through the volume adjustment buttons 144 and 146. At any time, if no further input is received from the volume adjustment buttons 144 and 146 for a predetermined time period, the display function of the touch screen 130 would be disabled when the timer exceeds the predetermined timer period. Furthermore, the electronic device 100 may be set to a silent mode or a vibration mode through the volume adjustment buttons.

Figure 10C:
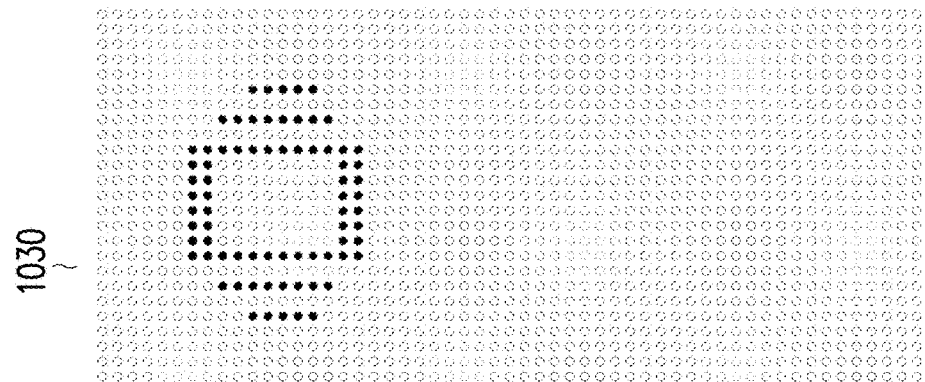
FIG. 10A~10C illustrate a user interface of a volume adjustment of the electronic device in the dot-matrix display mode according to one of the exemplary embodiments of the disclosure.
Figure 10B:
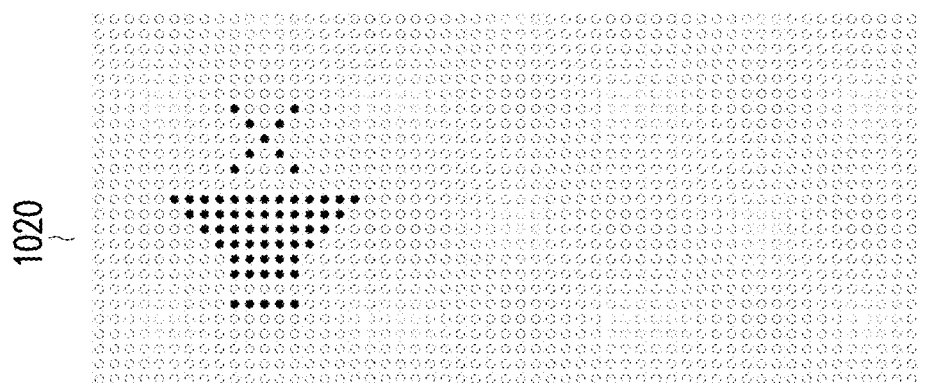
Figure 10A:
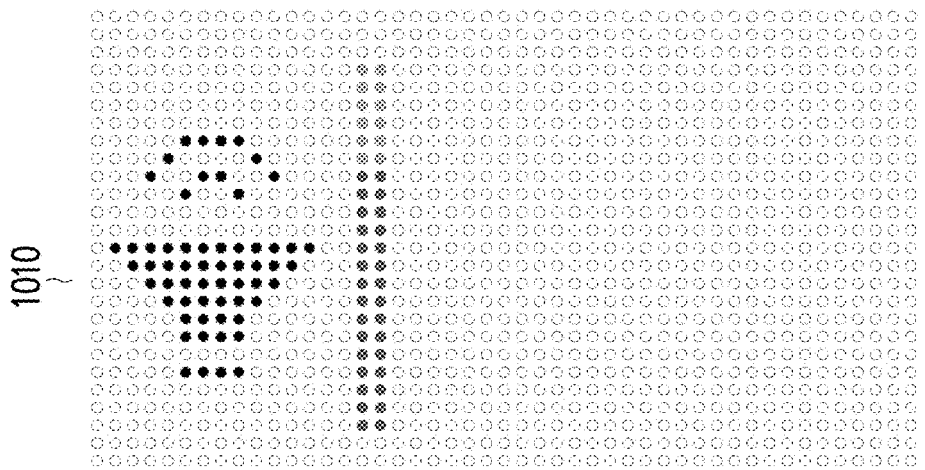

FIGS. 10A-10C are diagrams illustrating a user interface of the electronic device 100 for an alert function according to one of the exemplary embodiments of the disclosure. The exemplary electronic device 100 of FIG. 1 may include an alert function such as an alarm clock, a scheduled event in the calendar, a timer or the likes. The present embodiment allows a user to interact with the electronic device 100 without the need of opening the cover portion 220 in event of the alert functions.

Figure 11A:
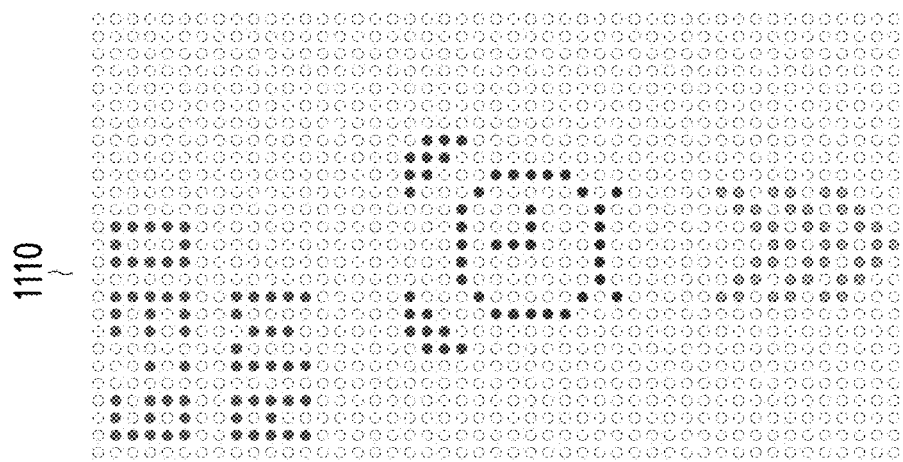
FIG. 11A~11C illustrate a user interface of the electronic device 100 for an alert function according to one of the exemplary embodiments of the disclosure.
Figure 11B:
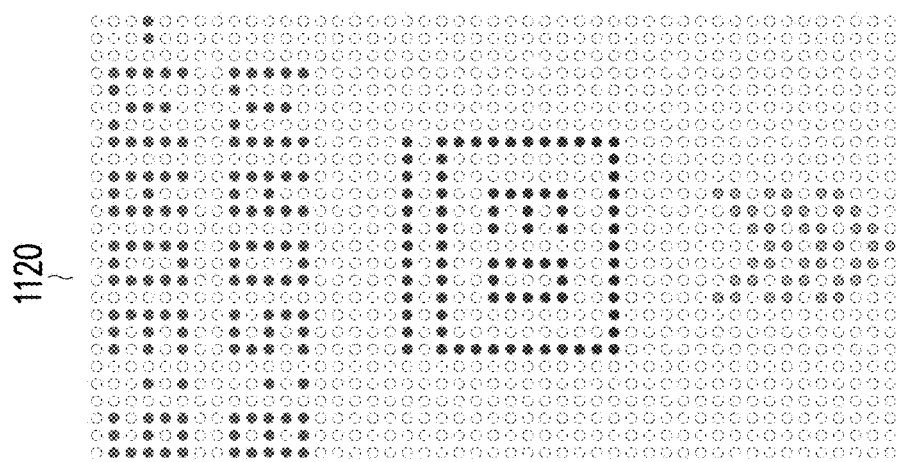
Figure 11C:
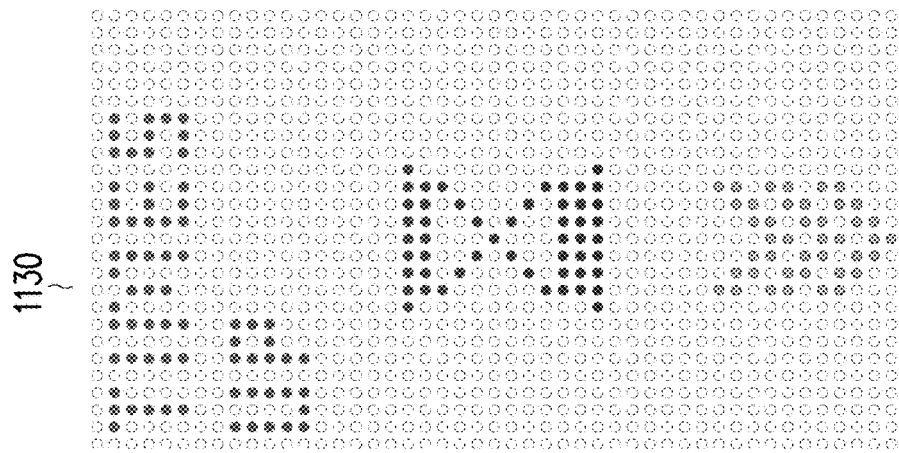

When one of the alert functions is triggered (i.e., an event), the electronic device 100 would display an image corresponding to the triggered in the display area 132 to inform the user and to prompt the user for action. FIG. 11A is a diagram illustrating an image 1110 corresponding an event of alarm clock. FIG. 11B is a diagram illustrating an image 1120 corresponding to an event of a calendar schedule. FIG. 11C is a diagram illustrating an image 1130 corresponding to an event corresponding to timer. An upper section of the images 1111, 1120, 1130 would display information regarding to the triggered alert functions for the user to view, and a lower section of the images 1111, 1120, 1130 would display an interactive arrow for the user to dismiss the alert function. At the same, the electronic device would start a timer in response to the alert function.

Once the user is informed of the alert functions, the user may dismiss the alert function with a touch operation by swiping his or her finger toward a direction indicated by the interactive arrow or with an input operation by pressing the input device 140. If no action is performed within a predetermined time period, the electronic device 100 would dismiss or delay the alert functions automatically when the timer exceeds the predetermined timer period.

Figure 12B:
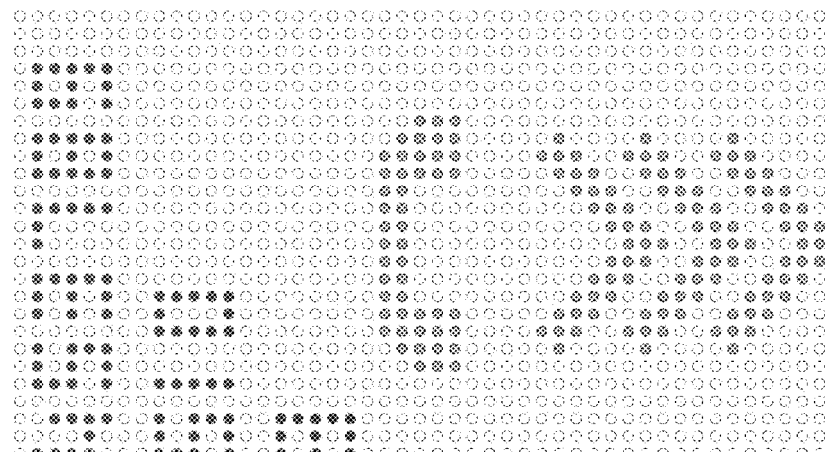
FIG. 12A~12B are diagrams illustrating a user-interface when the electronic device 100 has an incoming call according to one of the exemplary embodiments of the disclosure.
Figure 12A:
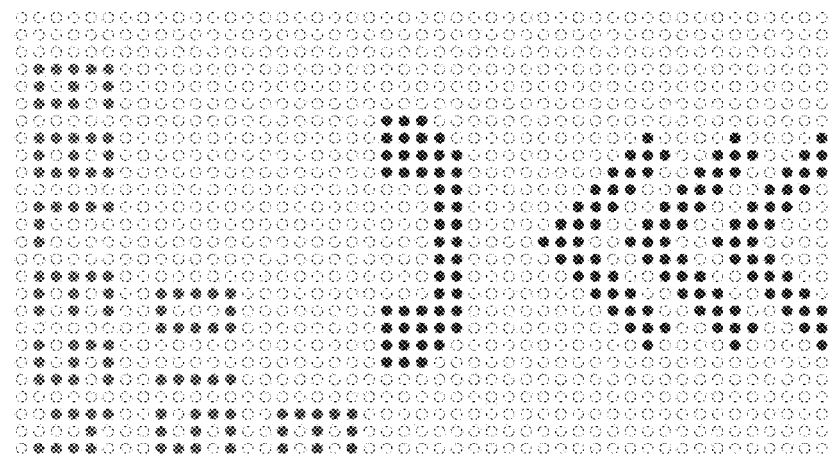

FIGS. 12A-12B are diagrams illustrating a user-interface when the electronic device 100 has an incoming call according to one of the exemplary embodiments of the disclosure. In the present embodiment, the exemplary electronic device 100 of FIG. 1 allows a user to interact with the electronic device 100 when the electronic device 100 has an incoming call. The present embodiment allows a user to pick up or disregard the incoming call without the need of opening the cover portion 220 in event of the alert functions.

First, an event is triggered by the incoming call. With reference to FIGS. 12A and 12B, the electronic device 100 would display an image 1210 or 1220 which includes incoming call information and an interactive action on the touch screen 130 in response to the event. The interactive action may include an arrow pointing downward or upward, where the arrow pointing downward may be a function to disregard the incoming call, and the arrow pointing upward may be a function to pick up the incoming call. The present embodiment may animate the arrow by displaying the images 1210 and 1220, alternatively. However, the disclosure does not limited thereto.

Then, the user may operate the electronic device 100 (i.e., pickup or disregard the incoming call) by swiping his or her finger upward or downward on the cover portion 220. In another exemplary embodiment, the operation may also be performed through the input device 140 of the electronic device 100. For example, the user may disregard the incoming call or mute a ringer volume through the input device 140.

Figure 13:
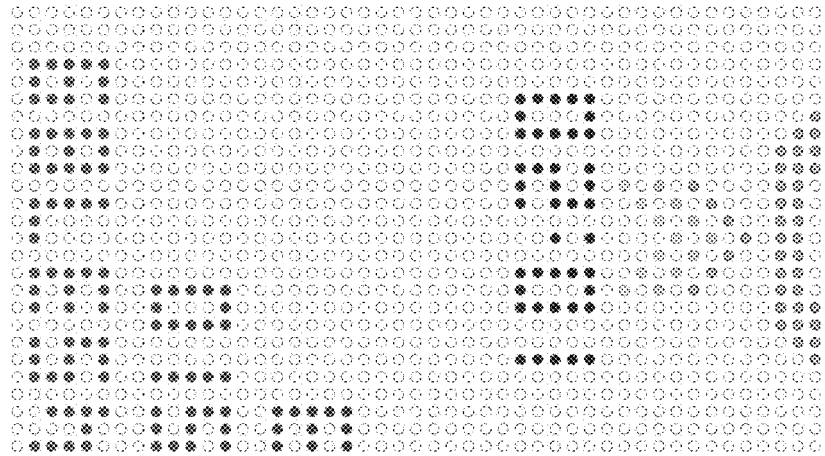
FIG. 13 illustrates an image that could be displayed in an display area of an electronic device to show the caller information, elapsed time, and a downward arrow representing a disconnect operation in accordance with one of the exemplary embodiments of the disclosure.

FIG. 13 is a diagram illustrating a user-interface of the electronic device 100 when the electronic device 100 is in a call according to one of the exemplary embodiments of the disclosure. In the present embodiment, the exemplary electronic device 100 of FIG. 1 allows a user to interact with the electronic device 100 during a process of a call (i.e., in-call). The present embodiment allows the user to view in-call information (e.g., elapsed time and caller information) and to disconnect to call.

In the present embodiment, the exemplary electronic device of FIG. 1 may further include a proximity sensor 150. The proximity sensor 150 is coupled to the processor and controller circuit 110 and configured to detect an object. For example, the user typically has the electronic device 100 in a position leaning against an ear or face while the user is in a call. Therefore, the display function of the touch screen 130 would be disabled while the user is in a call according to the proximity sensor 150. In the present embodiment, the proximity sensor 150 may be utilized to determine whether the user has moved the electronic device 100 away from the ear or other objects while the user is in a call. When the electronic device 100 determines that the electronic device 100 is not in a position leaning against user's ear or other objects while the electronic device 100 is in a call in accordance with the proximity sensor 150, an event is triggered.

With reference to FIG. 13, an image 1310 may be displayed in the display area 132 showing the caller information, elapsed time, and a downward arrow representing a disconnect operation. Then, the user may operate the electronic device 100 by swiping his or her finger toward a direction indicated by the image 1310 to perform a corresponding function. For example, the user may disconnect the call by swiping downward.

FIGS. 14A-14E are diagrams illustrating a user-interface when the electronic device 100 has a notification in the dot-matrix display mode according to one of the exemplary embodiments of the disclosure. In the present embodiment, the exemplary electronic device 100 of FIG. 1 allows a user to interact with the electronic device 100 when the electronic device 100 has a notification.

Figure 14C:
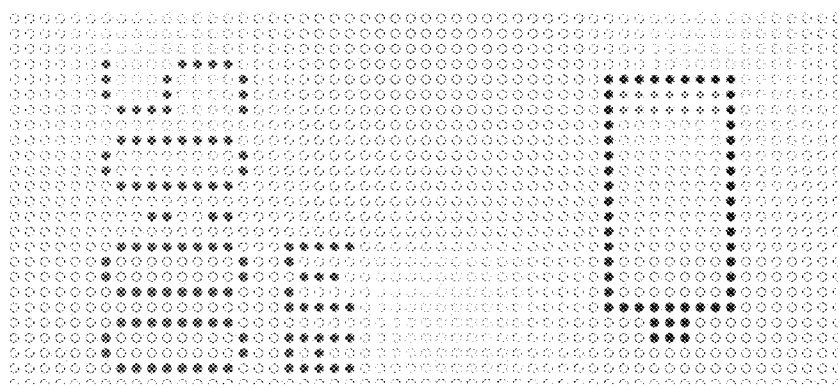
Figure 14B:
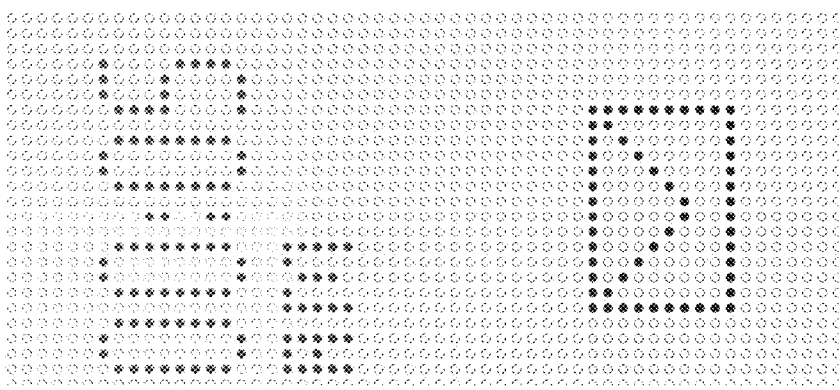
Figure 14A:
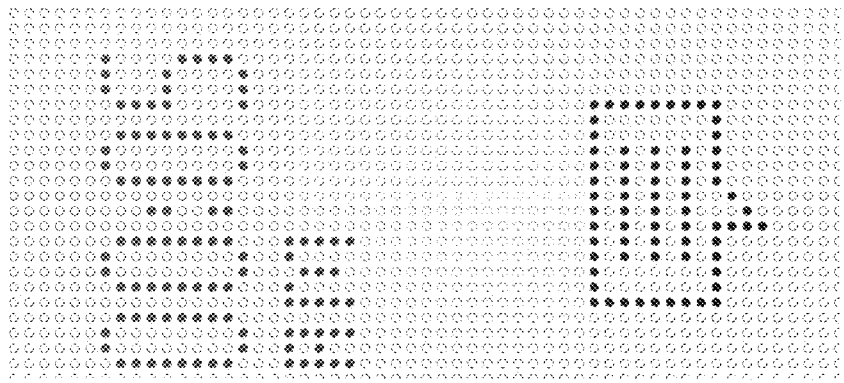

In detail, in the occurrence of the notification (i.e., an event is triggered), the electronic device 100 would display the type of the notification for user to view. At the same time, the electronic device 100 would start a timer. In the present embodiment, the notification may include low battery, new email message, new text message, to-do list, and new voice message. FIG. 14A illustrates an exemplary image 1410 showing a low battery notification. FIG. 14B illustrates an exemplary image 1420 showing a new email message notification. FIG. 14C illustrates an exemplary image 1430 showing a new text message notification. FIG. 14D illustrates an exemplary image 1440 showing a to-do list notification. FIG. 14E illustrates an exemplary image 1450 showing a new voice message notification.

Then, the electronic device 100 may receive responses through the input device 140 event or the touch screen 130 to disable the display function of the touch screen 130. Otherwise, the display function of the touch screen 130 would be disabled when the timer exceeds a predetermined time period.

It should be noted that the notification may not be dismissed while the electronic device 100 is in the dot-matrix display mode until the notification is cleared manually. For example, the new email message notification may not be cleared until the notification is manually cleared. To clear the notification, detail of the new email message has to be viewed (e.g., opening an email message corresponding to the notification) or the notification may be manually cleared by the user. Therefore, if there is a notification that is not cleared while an event is triggered by an input through the input device 140 or the touch screen 130, the electronic device 100 would display the notification rather than the time and weather information image or other images.

Furthermore, in a situation where there are several notifications that are not cleared, the electronic device 100 would display the notification last appeared. For example, in a case where notifications are appeared in an order of new email message, new voice message and new text message, the electronic device 100 would display the new text message notification in response to an input event through the input device 140 or the touch screen 130.

In summary, the disclosure provides a user interface for an electronic device having a display area covered a protective accessory. The user interface provides a controlling method that allows a user to interact with the electronic device without the need of uncovering the display area of the electronic device. The electronic device may display an image in a dot matrix pattern for user to view in response to an event, and accordingly a response corresponding to the displayed image may be provided by the user.

In another one of the exemplary embodiments, the cover mentioned above can be used to protect an electronic device and be implemented as that of one of the HTC DOT VIEW™ cases on the market. In order to control images through the cover by the electronic device, the electronic device may include a processor arranged for controlling operations of the electronic device. For example, the processor may run program codes such as applications, or other types of programs to control operations of the electronic device, and more particularly, to perform Dot View control associated to the HTC DOT VIEW™ cases. For example, the aforementioned Dot View control may include theme color auto-selection and user interface control. In some examples, the aforementioned theme color auto-selection and the aforementioned user interface control could be implemented independently. In some examples, the aforementioned theme color auto-selection could be applied to the electronic device in a situation where the electronic device is not equipped with one of the HTC DOT VIEW™ cases.

In order to achieve the goal of theme color auto-selection, the key color should be determined first. Key color can be the most part of the color in the main background image. When the user selects (or sets) an image as the main background image, the electronic device automatically determines the key color corresponding to the main background image, and utilizes this key color as the theme color. As a result, the user does not need to manually select the theme color from a plurality of candidate theme colors.

Figure 15:
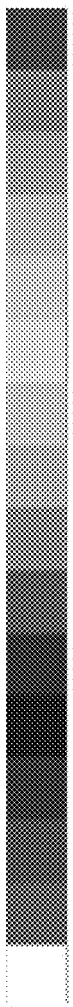
FIG. 15 illustrates a key color table in accordance with one of the exemplary embodiments of the disclosure.

The followings describe the feature related to theme color auto-selection. FIG. 15 illustrates a key color table in accordance with one of the exemplary embodiments of the disclosure. As shown in FIG. 15, there are 16 key colors in the key color table of this example. This is for illustrative purposes only, and is not meant to be a limitation of the present invention. In some examples, the number of key colors in the key color table may vary.

For example, the key colors may comprise colors respectively corresponding to different sets of color coordinate values. This is for illustrative purposes only, and is not meant to be a limitation of the present invention. In another example, the key colors may comprise red, orange, yellow, green, blue, purple, and white. In practice, the key color table can be determined in advance (or pre-defined) by the designer(s) of the electronic device. In addition, a mapping table for converting various colors of a specific color format into the key colors in the key color table can be determined in advance (or pre-defined) by the designer(s) of the electronic device. By using the mapping table, the electronic device can automatically determine the key color corresponding to the main background image.

A method for determining the key color corresponding to the main background image can be described as follows. First, the feature related to pre-processing by performing color clustering for input image via the use of static color table is described. For this particular feature, a linear quantization technique as well as a non-linear RGB quantization technique could be used.

For example, the color clustering for an input image may include mapping full color such as RGBA (more particularly, RGBA8888) to RGB332, where the full color format such as the RGBA format (more particularly, the RGBA8888 format) uses more bits to represent a pixel than the RGB332 format. This is for illustrative purposes only, and is not meant to be a limitation of the present invention. In another example, the full color format such as the RGBA format can be replaced by any of other color formats (e.g. CMYK/YUV/HSV, etc.).

In another example, the full color format such as the RGBA format and the RGB332 format can be replaced by a first format and a second format, respectively, where the second format may represent the color clustering result. Generally speaking, the second format not only keeps the significant relation (or significant information) of the first format, but also uses less resource to represent the first color format.

The electronic device (more particularly, the processor executing the program codes mentioned above) may convert pixel information of each pixel in the main background image (e.g. an image of the full color format such as the RGBA format) into corresponding pixel information having significant bits, which may be obtained from the aforementioned pixel information of the aforementioned each pixel in the main background image. As a result, the amount of information can be reduced while the significant colors of the pixels can be maintained.

Secondly, the feature related to remapping colors of pre-processing is described. The processor of the electronic device may pre-generate a mapping table such as that mentioned above, where the mapping table can be used for mapping RGB332 colors (i.e. the colors of the RGB332 format, such as 256 different colors) to the 16 key colors in this example, respectively.

Next, the feature related to performing statistics for choosing "key color" is described. Before choosing the key color, the processor of the electronic device may first apply a scale down to an input image (e.g. the main background image, or color clustered image of the main background image) to reduce the number of pixels. The processor of the electronic device may scan the pixels (more particularly, the reduced pixels) to determine the common color (e.g. the majority color), and look for the mapping key color via pre-generated key color table.

For example, the electronic device (more particularly, the processor executing the program codes mentioned above) may perform scale down on the input image such as the main background image to generate a scaled down image, and then perform color clustering (e.g. full color such as RGBA to RGB332 conversion) on the scaled down image to generate a color-clustered image, and further perform statistics operations to find out the majority color in the color-clustered image, where the number of pixels of the majority color is typically greater than that of any other color in the image under consideration (e.g. the color-clustered image in this example). Afterward, based on the mapping table, the electronic device (more particularly, the processor executing the program codes mentioned above) may map the majority color to a specific key color within the 16 key colors, and determines the specific key color as the key color corresponding to the main background image. As a result, the electronic device (more particularly, the processor executing the program codes mentioned above) automatically determines the key color corresponding to the main background image, and utilizes this key color as the theme color. This is for illustrative purposes only, and is not meant to be a limitation of the present invention.

In another example, the aforementioned scale down can be omitted, where the electronic device (or the processor executing the program codes mentioned above) may perform the aforementioned color clustering on the input image such as the main background image directly, to generate the color-clustered image mentioned above. For brevity, similar descriptions for this example are not repeated in detail here.

In another example, the aforementioned color clustering can be performed first, and more particularly, can be performed prior to the aforementioned scale down. Thus, the electronic device (or the processor executing the program codes mentioned above) may perform the aforementioned color clustering on the input image such as the main background image directly to generate a color-clustered image, and then perform the aforementioned scale down on this color-clustered image to generate a scaled down image, and further perform statistics operations to find out the majority color in this scaled down image, where the number of pixels of the majority color is typically greater than that of any other color in the image under consideration (e.g. this scaled down image in this example). Afterward, based on the mapping table, the electronic device (more particularly, the processor executing the program codes mentioned above) may map this majority color to a specific key color within the 16 key colors, and determines this specific key color as the key color corresponding to the main background image.

Figure 16:
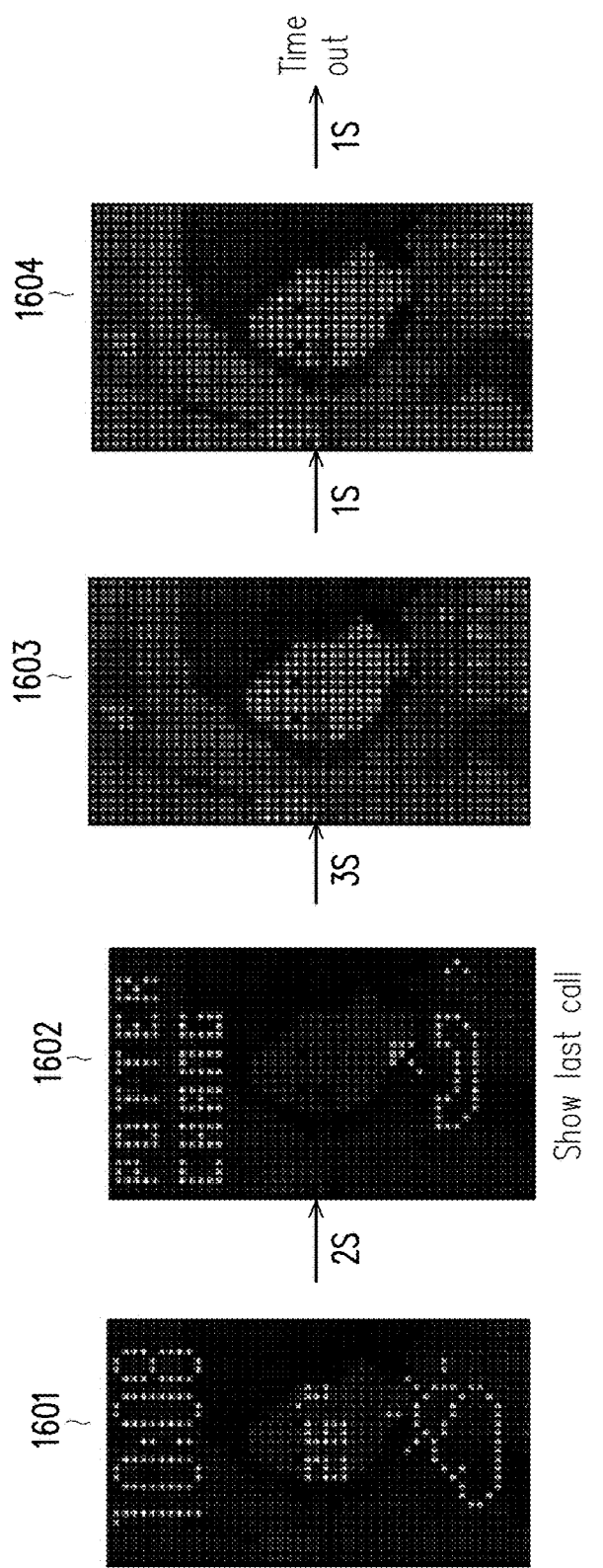
FIG. 16 illustrates a dot view idling procedure in accordance with one of the exemplary embodiments of the disclosure.

FIG. 16 illustrates a dot view idling procedure in accordance with one of the exemplary embodiments of the disclosure. The disclosure provides a user interface control mechanism when the Dot View is idle. As shown in FIG. 16, the electronic device (or the processor executing the program codes mentioned above) may control the touch sensitive display module to show the time, the temperature information, the weather information 1601, and/or a phone icon 1602 (e.g. one or more of the time, the temperature information, the weather information, and the phone icon) such as the time, the temperature information, and the weather information 1601 in this example for a few seconds such as two or more seconds (e.g. 2 seconds in this example), and then show the last call/miss-call icon 1602 (e.g. the last call icon or the miss-call icon, such as the last call icon in this example) for a few seconds such as two or more seconds (e.g. 3 seconds in this example), and further show the theme image 1603 for a few seconds such as one or more seconds (e.g. 1 second in this example), and then show a dim version 1604 (or darkened version) of the theme image for a few seconds such as one or more seconds (e.g. 1 second in this example).

In practice, the total idle time may depend on the time out setting. For example, the total idle time can be set as 7 seconds, 10 seconds, or 15 seconds. This is for illustrative purposes only, and is not meant to be a limitation of the present invention. In some examples, the candidate values of the total idle time may vary.

In addition, the name displayed along with the last call/miss-call icon can be listed in two lines (e.g. the given name of the person corresponding to the last call/miss-call can be listed in the first line, and the family name of this person can be listed in the second line). This is for illustrative purposes only, and is not meant to be a limitation of the present invention. In some examples, the number of lines for listing the name of this person may vary. In some examples, the name of this person can be listed in one line.

In addition, the name displayed along with the last call/miss-call icon can be stated still. This is for illustrative purposes only, and is not meant to be a limitation of the present invention. In some examples, the name of the person corresponding to the last call/miss-call may move on the touch sensitive display module (e.g. move horizontally). More particularly, in a situation where the name of this person is longer than that shown in FIG. 16, the name of the person corresponding to the last call/miss-call may move horizontally, allowing the user of the electronic device to clearly read the name of this person. Please note that the user of the electronic device may interrupt the Dot View idle procedure shown in FIG. 16.

Figure 17:
FIG. 17 illustrates a last call icon in accordance with one of the exemplary embodiments of the disclosure.
Figure 18:
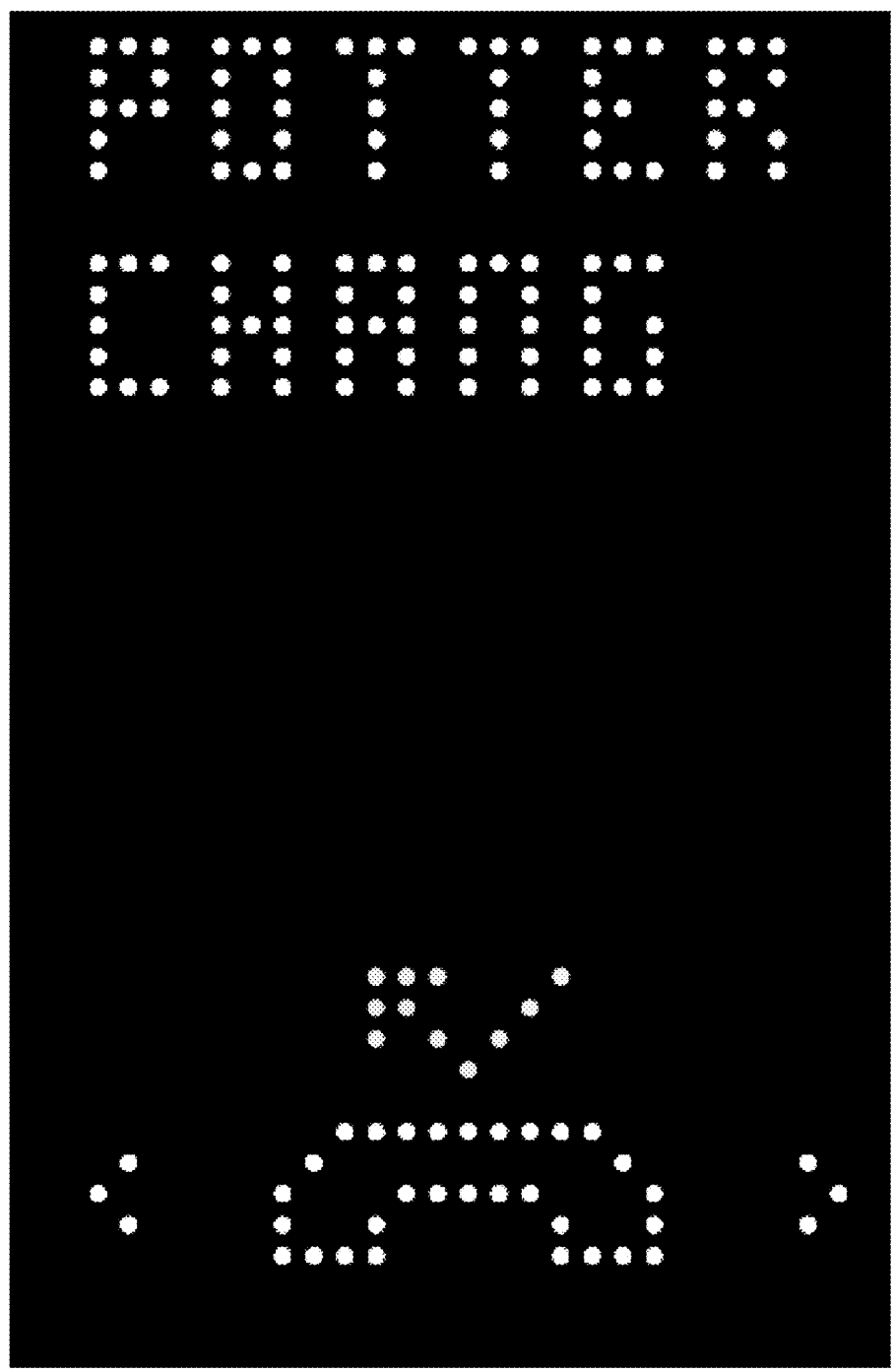
FIG. 18 illustrates a missed call icon in accordance with one of the exemplary embodiments of the disclosure.

FIG. 17 illustrates a last call icon in accordance with one of the exemplary embodiments of the disclosure. FIG. 18 illustrates a missed call icon in accordance with one of the exemplary embodiments of the disclosure. The last call icon and the missed call icon are to be used as examples to describe the following examples.

However, the technique of applying a user swipe in a L/R (left/right) direction to see last call/call history will first be described. For an example, when the user gesture is swipe left (i.e. the swipe left gesture), the electronic device (more particularly, the processor executing the program codes mentioned above) may control the touch sensitive display module to show the next record in the call history. For another example, when the user gesture is swipe right (i.e. the swipe right gesture), the electronic device (more particularly, the processor executing the program codes mentioned above) may control the touch sensitive display module to show the previous record in the call history. It should be noted that only a limited number of records (e.g. the latest 15 records) will be available in the Dot View call history procedure.

For consecutive same dialer calling-in records, they can be regarded as different records. This is for illustrative purposes only, and is not meant to be a limitation of the present invention. In some examples, they can be treated as the same record. More particularly, the person such as John calls in three consecutive times, and the electronic device (more particularly, the processor executing the program codes mentioned above) may treat the three records as the same record in the Dot View call history procedure, where the record of "John" is shown as one record only.

Next, a technique used to make a phone call on Dot View is provided. For example, the user may use the swipe up gesture to call out, where the sensitive area can be the whole screen area of the touch sensitive display module. In this example, when the user gesture is swipe up, the electronic device (more particularly, the processor executing the program codes mentioned above) may dial the contact number corresponding to the current record of the call history. In a situation where the current record of the call history is the call/miss-call mentioned above, the electronic device (more particularly, the processor executing the program codes mentioned above) may dial the contact number corresponding to the call/miss-call.

The disclosure provides a dismiss phone call mode. For example, the user may use the swipe down gesture to leave the phone mode. In this example, when the user gesture is swipe down, the electronic device (more particularly, the processor executing the program codes mentioned above) may switch back to the idle mode such as that of the Dot View idle procedure shown in FIG. 16.

In some examples, when the user may use the swipe down gesture to leave the phone mode, the electronic device (or processor executing the program codes mentioned above) may control the touch sensitive display module to show the time, the weather information, and/or the phone icon for a few seconds such as two or more seconds (e.g. 2 seconds in this example), and then show the time, the temperature information, and/or the phone icon for a few seconds such as two or more seconds (e.g. 2 seconds in this example), and further show the theme image for a few seconds such as one or more seconds (e.g. 1 second in this example), and then show a dim version (or darkened version) of the theme image for a few seconds such as one or more seconds (e.g. 1 second in this example).

Figure 19:
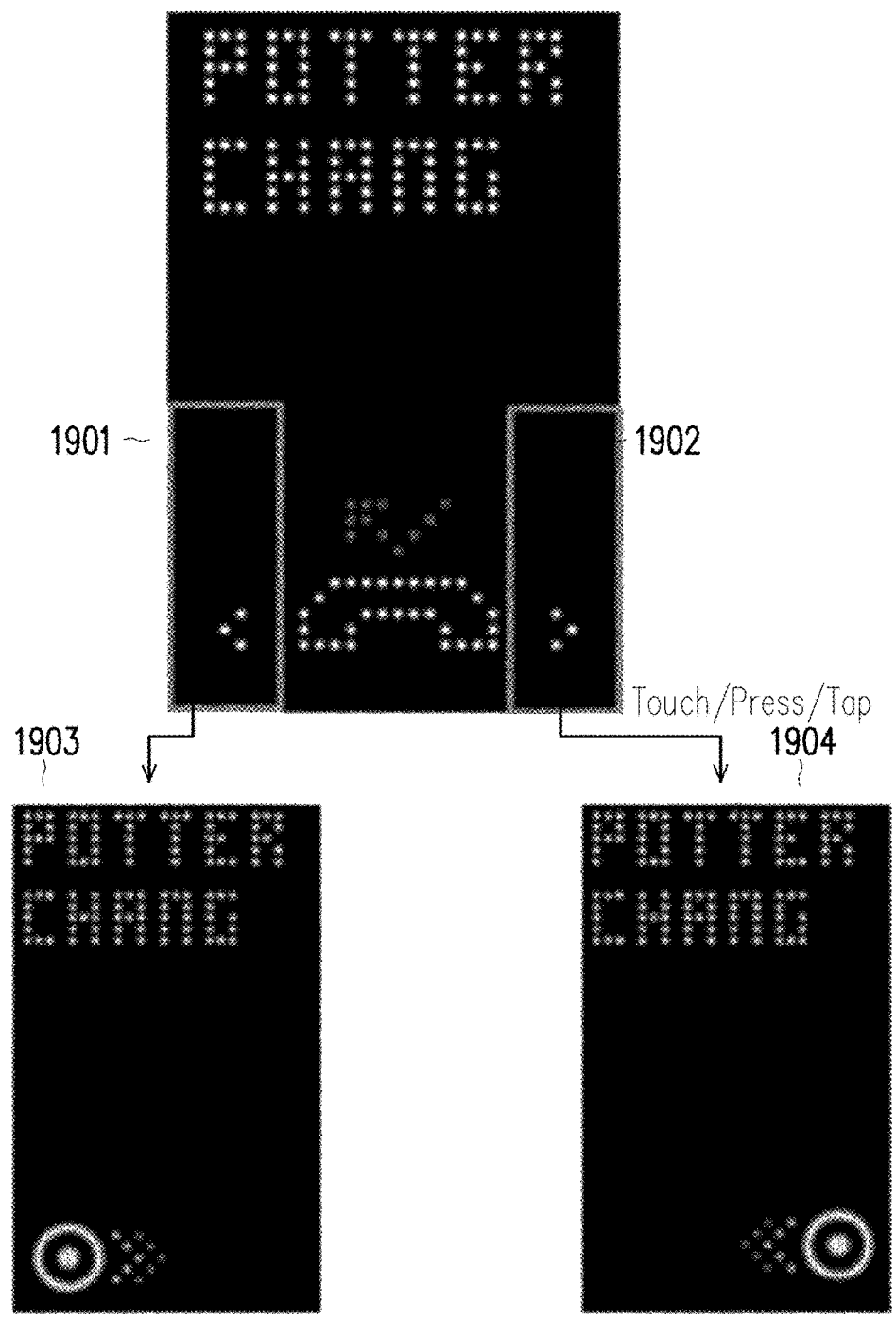
FIG. 19 illustrates animations and associated controls in accordance with one of the exemplary embodiments of the disclosure.

FIG. 19 illustrates animations and associated controls in accordance with one of the exemplary embodiments of the disclosure. As shown in FIG. 19, when the user touches (or presses, or taps) the ">" icon 1902, the electronic device (more particularly, the processor executing the program codes mentioned above) may control the touch sensitive display module to show a "<<<<<" animation 1904 such as that in the screen content shown around the lower right corner of FIG. 19, to indicate the user to swipe left, where the "<<<<<" animation 1904 of this example may comprise a series of "<" which may be displayed in turns or displayed in groups, and therefore can be regarded as a moving "<" that moves leftward.

In addition, when the user touches (or presses, or taps) the "<" icon 1901, the electronic device (more particularly, the processor executing the program codes mentioned above) may control the touch sensitive display module to show a ">>>>>" animation 1903 such as that in the screen content shown around the lower left corner of FIG. 19, to indicate the user to swipe right, where the ">>>>>" animation 1903 of this example may comprise a series of ">" which may be displayed in turns or displayed in groups, and therefore can be regarded as a moving ">" that moves rightward.

In some examples, when the user touches the miss-call icon around the bottommost of the screen content shown in the upper half of FIG. 19 and applies a swipe down gesture to this miss-call icon, the electronic device (or the processor executing the program codes mentioned above) may trigger the aforementioned "<<<<<" animation 1904 and the aforementioned ">>>>>" animation 1903 in turn. For example, the aforementioned "<<<<<" animation 1904 and the aforementioned ">>>>>" animation 1903 can be triggered alternatively and repeatedly.

For another example, when the user gesture is swipe left (i.e. the swipe left gesture), the electronic device (more particularly, the processor executing the program codes mentioned above) may control the last call/miss call icon (together with the name of the person corresponding to the last call/miss call) to move leftward and fade out around the left side of the touch sensitive display module, and may show the next record by controlling the next record to come from the right side of the touch sensitive display module.

For another example, when the user gesture is swipe right (i.e. the swipe right gesture), the electronic device (more particularly, the processor executing the program codes mentioned above) may control the last call/miss call icon (together with the name of the person corresponding to the last call/miss call) to move rightward and fade out around the right side of the touch sensitive display module, and may show the previous record by controlling the next record to come from the left side of the touch sensitive display module.

Figure 20:
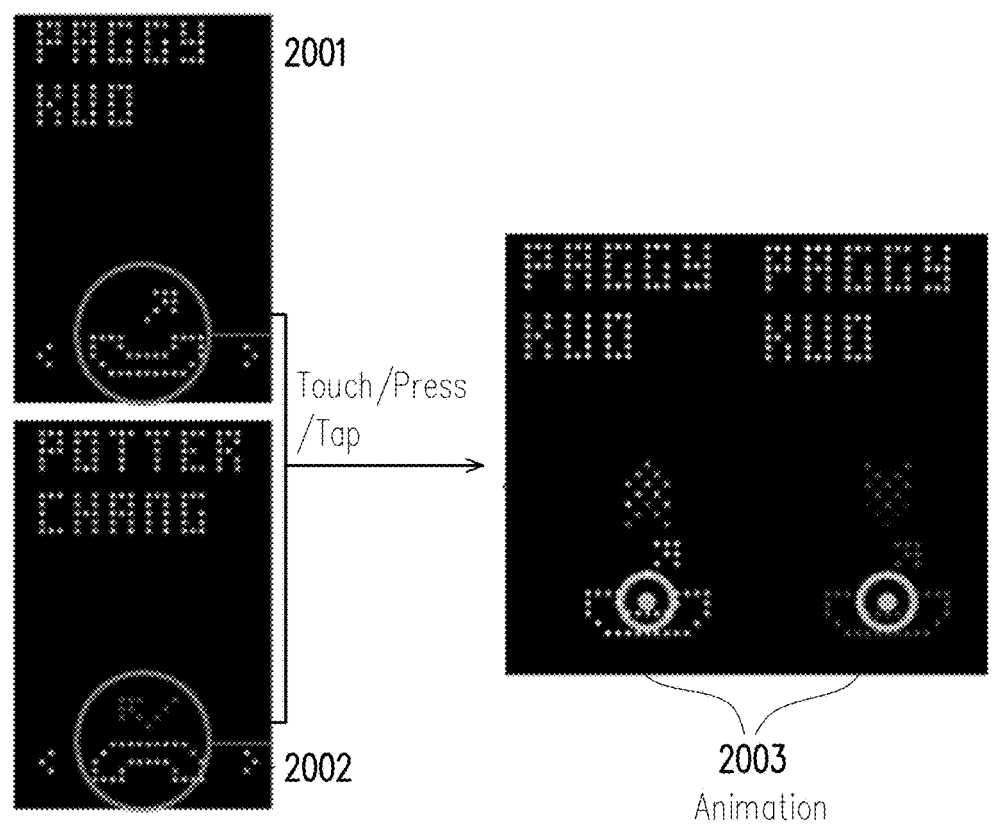
FIG. 20 illustrates animations and associated controls in accordance with one of the exemplary embodiments of the disclosure.

FIG. 20 illustrates animations and associated controls in accordance with one of the exemplary embodiments of the disclosure. As shown in FIG. 20, when the user touch the last call/miss call icon mentioned above, the associated animation may be triggered. For example, when the user touches the last call icon 2001 in the screen content shown around the upper left of FIG. 20 and applies a swipe down gesture to this last call icon, the electronic device (or the processor executing the program codes mentioned above) may trigger a series of animations 2003 respectively corresponding to the records in the call history in turn. For example, the aforementioned series of animations can be triggered alternatively and repeatedly.

In another example, when the user touches the miss-call icon 2002 in the screen content shown around the lower left of FIG. 20 and applies a swipe down gesture to this miss-call icon, the electronic device (or the processor executing the program codes mentioned above) may trigger a series of animations 2003 respectively corresponding to the records in the call history in turn. For example, the aforementioned series of animations can be triggered alternatively and repeatedly.

Figure 21:
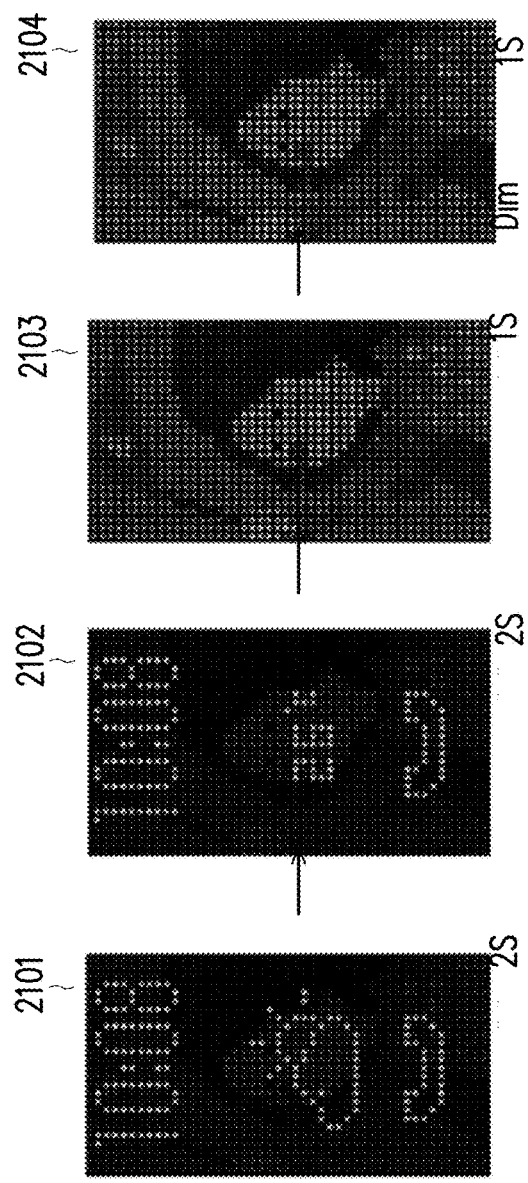
FIG. 21 illustrates a dot view idling procedure in accordance with one of the exemplary embodiments of the disclosure.

FIG. 21 illustrates a dot view idling procedure in accordance with one of the exemplary embodiments of the disclosure. In some examples, the Dot View idle procedure shown in FIG. 16 and the associated control may vary. For example, as shown in FIG. 21, the electronic device (more particularly, the processor executing the program codes mentioned above) may control the touch sensitive display module to show the time, the weather information 2101, and the phone icon 2102 mentioned above for a few seconds such as two or more seconds (e.g. 2 seconds in this example), and then show the time, the temperature information 2101, and the phone icon 2102 for a few seconds such as two or more seconds (e.g. 2 seconds in this example), and further show the theme image 2103 for a few seconds such as one or more seconds (e.g. 1 second in this example), and then show a dim version 2104 (or darkened version) of the theme image for a few seconds such as one or more seconds (e.g. 1 second in this example). In practice, the total idle time may depend on the time out setting. For example, the total idle time can be set as 6 seconds, 10 seconds, or 15 seconds. This is for illustrative purposes only, and is not meant to be a limitation of the present invention. In some examples, the candidate values of the total idle time may vary.

Figure 22:
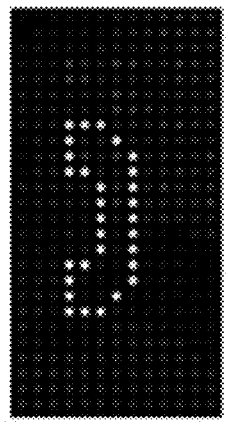
FIG. 22 illustrates a phone icon in accordance with one of the exemplary embodiments of the disclosure.

FIG. 22 illustrates a phone icon in accordance with one of the exemplary embodiments of the disclosure. 5. User tap "phone icon" to enter phone mode FIG. 22 illustrates a phone icon such as that shown in FIG. 21 according to an example. For example the user may tap the phone icon to enter the phone mode mentioned above. In the phone mode, the user may swipe L/R to see the last call/miss-call in the call history, as mentioned in above. For brevity, similar descriptions for this example are not repeated in detail here.

Figure 23:
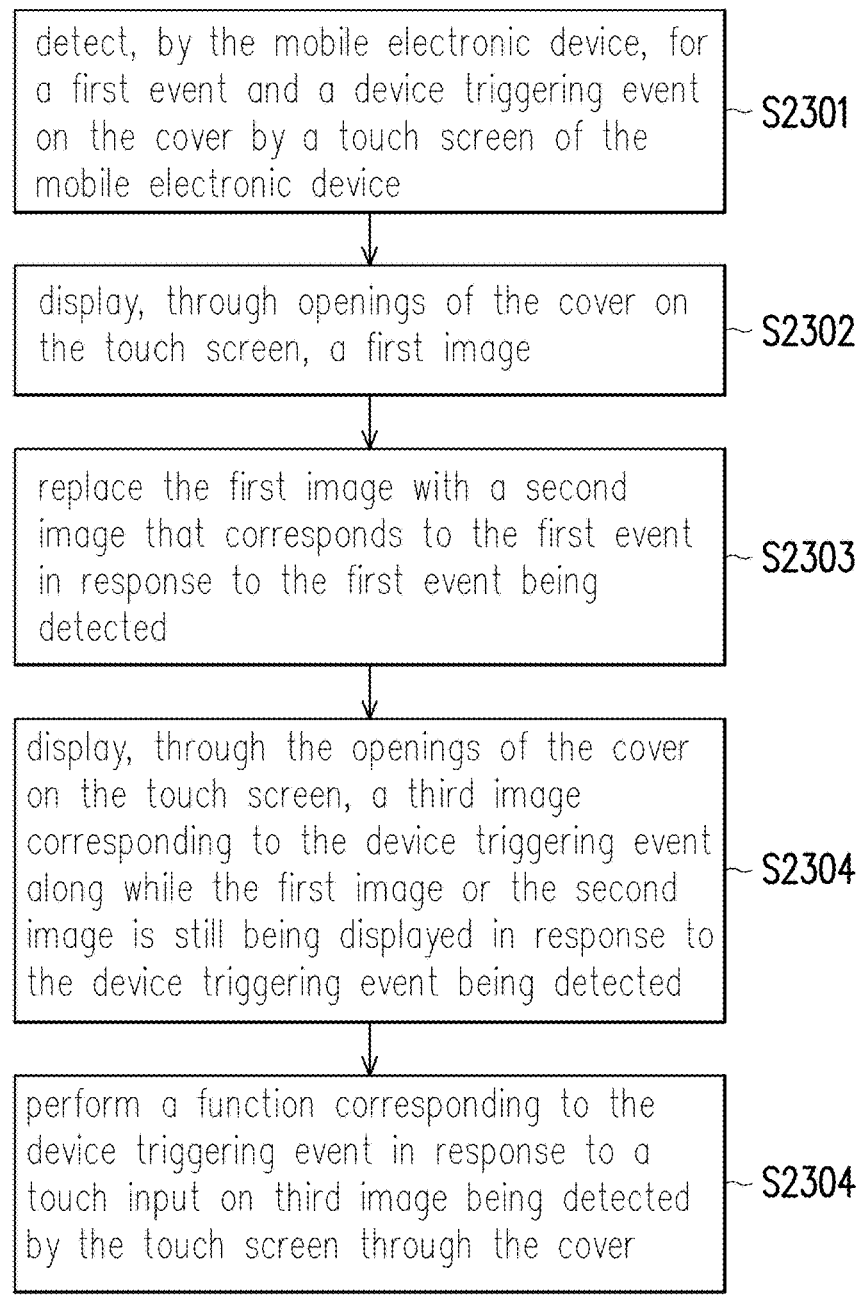
FIG. 23 illustrates a method of controlling a mobile electronic device through a cover according one of the exemplary embodiments of the disclosure.

FIG. 23 illustrates controlling a mobile electronic device to respond to a time based event or a device trigger event according one of the exemplary embodiments of the disclosure. In step S2301, the mobile electronic device would detect for a first event and a device triggering event on the cover by a touch screen of the mobile electronic device. The first event, for example, could be a time based event generated by an application of the mobile electronic device. For example, the first event could be a holiday event such as Independence Day or Thanksgiving generated by a calendar application which keeps track of these events. The first event could also be generated by a timer application which provides an alarm clock or timing related applications. Moreover, the first event could also be a non-time based event or any one time event generated by any application. The first event could also be received from a server. For example, the first event could be a birthday event received from a social network. The device trigger event could be an asynchronous event generated by a software or hardware trigger of the mobile electronic device.

The device trigger event could be, for example, generated by the mobile electronic device in response to a phone call, a text message, an instant message, a voice message, a video message, and so on. The device trigger event could also be generated in response to a user touch on the cover of the mobile electronic device. The device trigger event could also be generated in response to events described in step S710, step S720, and step S730, or the device trigger event could be generated according to the events as stated by the descriptions for FIG. 11A~FIG. 11C, FIG. 11A~12B, and FIG. 13.

In step S2302, the mobile electronic device may display, through openings of the cover on the touch screen, a first image. The first image could be a default image that has been preconfigured or selected by the user of the mobile electronic device. When a user views the first image through the cover, the first image could be displayed to the user in the Dot View form. In step S2203, in response to the aforementioned first event being detected, the first image which could be the default image could be replaced by a second image which would be an image related to the first event. For example, when a Christmas event generated by the calendar applicant has been detected, a second image which is an image having a Christmas theme would replace the default image. However, when the Christmas event is over, the second image could be reverted back to the first image.

In step S2304, in response to the device trigger event being detected, the mobile electronic device would display, through the openings of the cover on the touch screen, a third image corresponding to the device triggering event along while the first image or the second image is still being displayed. For example, assuming that the device trigger event is a phone call, the third image could be a phone call icon that is similar to the icon shown in FIG. 12A. The phone call icon would be displayed along with the default image first image or the time based second image generated by the Calendar application or received from an external server. In step S2305, the user of the mobile electronic device would apply a touch input on the third image of the cover to perform a function corresponding to the device triggering event. For example, assuming that the device trigger event is a phone call and the third image is similar to the icon of FIG. 12A, the user may apply a touch and slide down input in the same direction as the arrow of FIG. 12A to take the phone call.

Furthermore, the mobile electronic device may measuring a first time duration with a timer in response to the triggering event being detected. Any user input on the touch screen through the cover could be disabled in response to exceeding the first time duration as well as all images from being displayed through the openings of the cover on the touch screen could be stopped in response to exceeding the first time duration.

The first image or the second image could be adjusted to be a lighter (or brighter) first image in response a second input being detected on the cover by the touch screen. For example, when a user simply touches the cover or when a user touches on the third image of the cover, the timer may measure a second time duration in response to the second input being detected on the cover by the touch screen. Any user input on the touch screen through the cover could be disabled in response to the second time duration being exceeded. The touch screen may also stop displaying through the openings of the cover in response to the second time duration being exceeded. Alternatively, when the touch screen displays through the cover the first image and the touch screen detects a touch on the cover or the third image portion of the cover, only half (e.g. bottom half) of the first image would be displayed in a water mark color or a lighter (or brighter) color of the first image, and the color of the other half would remain the same. Also alternatively, when the touch screen displays through the cover the second image and the user subsequently touches the second image or the third image displayed on top of the second image, only half (e.g. bottom half) of the second image would be displayed in a water mark or in a lighter (or brighter) color of the second image, and the color of the other half would remain the same.

In response to the user touching one of or a combination of the first image through the cover or the second image through the cover or the third image through the cover, a timer could be initiated to determine whether the user has touched first image or the second image beyond a predetermined period. In response to the timer exceeding the predetermined period, the lighter (or brighter) portion of the first image or the second image could be reverted back to the original first image or the second image. Also in response to a user preforming a specific action on the third image, the lighter (or brighter portion) of the first image or the second image could also be reverted back to the original first image or the second image. In general, in response to the mobile electronic device detecting a device trigger event, the first image or the second image could be displayed in a lighter (or brighter) color for the predetermined period until the predetermined period has expired or until the user has performed a certain action by a touch action on the third image.

Figure 24:
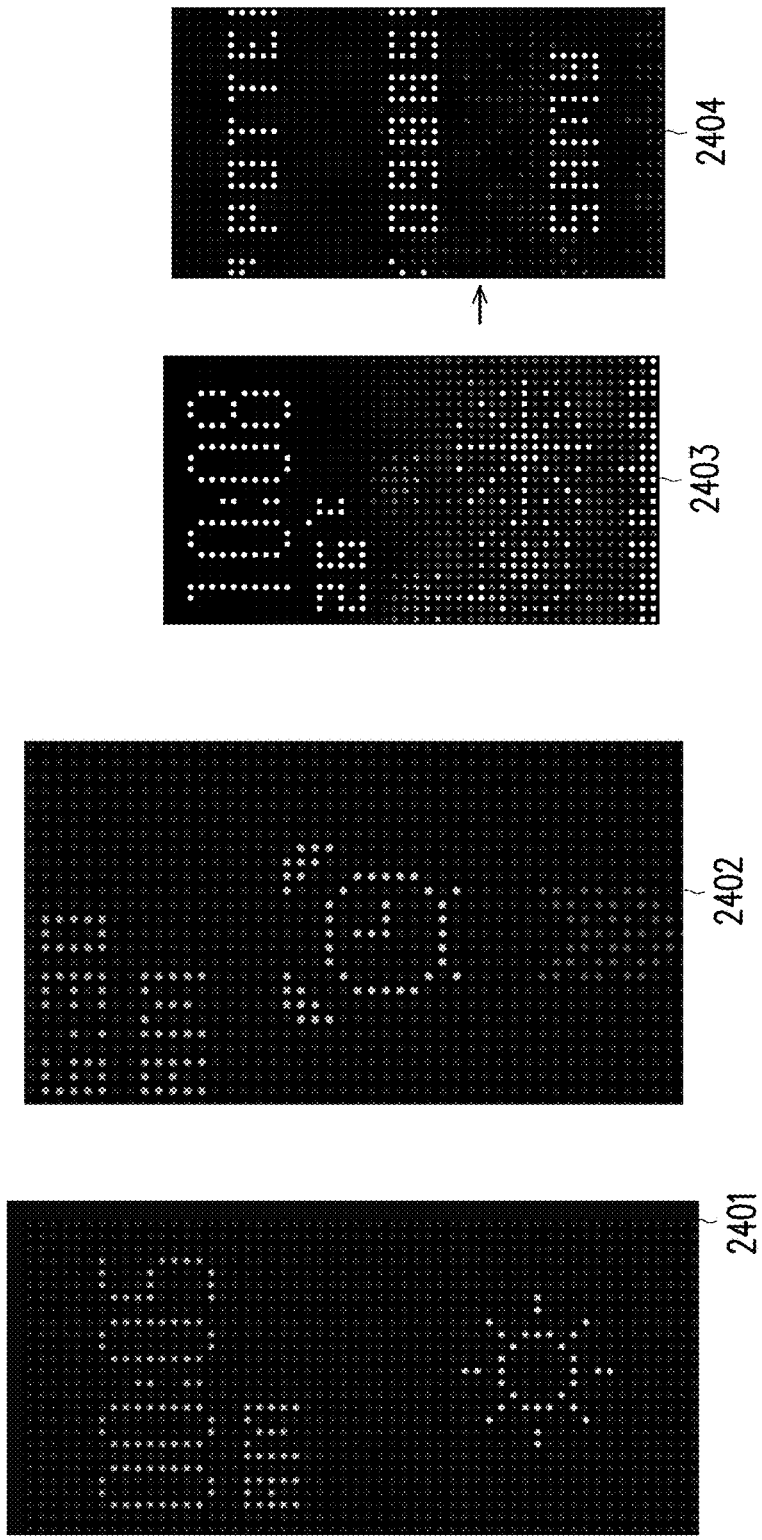
FIG. 24 illustrates a method of controlling a mobile electronic device to respond to a time based event or a device trigger event according one of the exemplary embodiments of the disclosure.

FIG. 24 illustrates another exemplary embodiment of a mobile electronic device controlling the touch screen to respond to a device trigger event and/or a time based event. The mobile electronic device may first display on the touch screen a first image that is a default image 2401 as a dot view image that is viewed through a cover. The default image 2401 is similar to the first image previously described in the embodiment of FIG. 23. In response to detecting device trigger event such as an alarm clock generated by a clock application or the expiration of a timer also generated by the clock application, the mobile electronic device may display on the touch screen a user interface that corresponds to the device trigger event. For this example, a clock with arrow image 2402 may correspond to the third image of the embodiment of FIG. 23 as an instruction to turn off the alarm clock is displayed so that a user may perform a touch and slide action in the same direction as the arrow to turn off the alarm clock.

The mobile electronic device may detect a time based event that is generated by a calendar application. The time based event could be a holiday event for example, and the holiday could be determined by a server or by a calendar application installed in the mobile electronic device. In response to the calendar application having determined that a holiday has occurred, the default image 2401 could be automatically replaced by a second image 2403 with a particular theme that is tied to the holiday. For instance, if the holiday is Thanksgiving, the second image 2403 could be an image of a turkey for example. When the holiday has passed, the second image 2403 could be automatically reverted back to the first image 2401. In response to a device trigger event, the second image 2403 could be dimmed or lightened (e.g. similar to a watermark). In an alternative embodiment, only the bottom half of the second image 2403 as shown in FIG. 24 would be lightened (or brightened). For example, the device trigger event could be generated by a user touching the cover or by touching the touch screen portion of the cover (i.e. the overlapping region between the touch screen and the cover), the second image 2403 would be lightened (or brightened). The second image 2403 could be lightened (or brightened) in response to a user touching a specific item of the user interface of second image 2403 instead of touching anywhere on the cover.

Alternative, the second image 2403 could be actually be dimmed or partially dimmed in response to a device trigger event that is externally triggered. For example, the device trigger event could be a phone call, a text message, or an instant message. In response to receiving a phone call for example, the second image 2403 could be dimmed and a third image could overlap the second image. The third image 2404 could be a phone call user interface that is a user interface associated with a phone call application so that a user would be able to operate the phone call user interface through the cover and not get distracted by the second image 2403. Similarly, when the second image 2403 is being displayed, a device trigger event generated by an event that is native to the mobile electronic device may also cause the second image 2403 to be lightened in order to a user interface of an image to be displayed on the second image 2043. For example, during Thanksgiving, the alarm clock user interface 2402 could be displayed on the second image 2402 which could be a turkey image. As the alarm clock is being triggered, the second image 2402 would be dimmed, and a user may apply a downward swipe action to turn off the alarm clock.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of" the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

Moreover, the claims should not be read as limited to the described order or elements unless stated to that effect. In addition, use of the term "means" in any claim is intended to invoke 35 U.S.C. § 112, ¶6, and any claim without the word "means" is not so intended.

What is claimed is:

1. A method of controlling a cover of a mobile electronic device comprising:
    displaying, through openings of the cover on a touch screen, a first image;
    detecting a first touch input on the cover by the touch screen;
    adjusting the first image be a lighter first image in response to the first touch input having been detected on the cover by the touch screen;
    detecting, by the mobile electronic device, a first event;
    replacing the first image with a second image that corresponds to the first event in response to the first event having been detected;
    detecting a second touch input on the cover by the touch screen; and
    adjusting the second image to be a lighter second image in response to the second touch input having been detected on the cover by the touch screen.

2. The method of claim 1, wherein the first event is a device triggering event that is received externally or generated by an application of the mobile electronic device.

3. The method of claim 2 further comprising:
    detecting, by the mobile electronic device, the device triggering event;
    displaying, through the openings of the cover on the touch screen, a third image corresponding to the device triggering event in response to the device triggering event being detected; and
    performing a function corresponding to the device triggering event in response to the first another touch input performed on the third image through the cover, wherein in response to the another touch input being performed on the cover, the another touch input is detected the touch screen through the cover.

4. The method of claim 1, wherein the first event is a holiday event according to an application of the mobile electronic device.

5. The method of claim 1, further comprising:
    replacing the second image with the first image in response to the expiration of the first event.

6. The method of claim 1, further comprising:
    displaying, through the openings of the cover on the touch screen, a plurality of different user interfaces in sequence as each of the plurality of user interfaces is displayed for a predetermined period.

7. The method of claim 6, wherein the plurality of user interfaces comprises a weather information user interface to be displayed for a first period, a phone icon user interface to be display for a second period, and a default user interface.

8. The method of claim 7, wherein the phone icon user interface comprises a phone icon, which upon touch, switches to a phone mode in which a call history is displayed in response to a gesture.

9. A mobile electronic device comprising:
    a touch screen for detecting touch events;
    a cover for covering the touch screen; and
    a processing circuit coupled to the touch screen and is configured at least for:
        displaying, through openings of the cover on a touch screen, a first image;
        detecting a first touch input on the cover by the touch screen;
        adjusting the first image be a lighter first image in response to the first touch input having been detected on the cover by the touch screen;
        replacing the first image with a second image that corresponds to the first event in response to the first event having been detected;
        detecting a second touch input on the cover by the touch screen; and
        adjusting the second image to be a lighter second image in response to the second touch input having been detected on the cover by the touch screen.

10. The device of claim 9, wherein the first event is a device triggering event that is received externally or generated by an application of the mobile electronic device.

11. The device of claim 10, wherein the processing circuit is further configured for:
    detecting, by the mobile electronic device, the device triggering event;
    displaying, through the openings of the cover on the touch screen, a third image corresponding to the device triggering event in response to the device triggering event being detected; and
    performing a function corresponding to the device triggering event in response to another touch input performed on the third image through the cover, wherein in response to the another touch input being performed on the cover, the another touch input is detected the touch screen through the cover.

12. The device of claim 9, wherein the first event is a holiday event according to an application of the mobile electronic device.

13. The device of claim 9, wherein the processing circuit is further configured for:
    replacing the second image with the first image in response to the expiration of the first event.

14. The device of claim 9, wherein the processor is further configured for:
    displaying, through the openings of the cover on the touch screen, a plurality of different user interfaces in sequence as each of the plurality of user interfaces is displayed for a predetermined period.

15. The device of claim 14, wherein the plurality of user interfaces comprises a weather information user interface to be displayed for a first period, a phone icon user interface to be display for a second period, and a default user interface.

16. The device of claim 15, wherein the phone icon user interface comprises a phone icon, which upon touch, switches to a phone mode in which a call history is displayed in response to a slide and touch gesture.

17. A mobile electronic device comprising:
- a touch screen for detecting touch events including a first event and a device trigger event;
- a cover for covering the touch screen; and
- a processing circuit coupled to the touch screen and is configured at least for:
  - displaying, through openings of the cover on the touch screen, a first image;
  - replacing the first image with a second image that corresponds to the first event in response to the first event being detected;
  - displaying, through the openings of the cover on the touch screen, a third image corresponding to the device triggering event in response to the device triggering event being detected;
  - performing a function corresponding to the device triggering event in response to a first touch input performed on the third image through the cover which covers the touch screen, wherein in response to the first touch input being performed on the cover, the first touch input is detected by the touch screen through the cover; and
  - adjusting the first image to be a lighter first image when displaying the first image or adjusting the second image to be a lighter second image when displaying the second image in response to the first touch input being detected on the third image of the cover by the touch screen.

18. A non-transitory storage medium, incorporated within a mobile electronic device having a cover, contains computer readable instructions which control the mobile electronic device to execute functions comprising:
- detecting, by the mobile electronic device, a first event and a device triggering event;
- displaying, through openings of the cover on a touch screen, a first image;
- replacing the first image with a second image that corresponds to the first event in response to the first event being detected;
- adjusting the first image be a lighter first image in response to a first input having been detected on the cover by the touch screen;
- adjusting the second image to be a lighter second image in response to a second input having been detected on the cover by the touch screen;
- displaying, through the openings of the cover on the touch screen, a third image corresponding to the device triggering event in response to the device triggering event being detected; and
- performing a function corresponding to the device triggering event in response to another touch input performed on the third image through the cover which covers the touch screen, wherein in response to the another touch input being performed on the cover, the another touch input is detected by the touch screen through the cover.

* * * * *